United States Patent
Lapido et al.

(10) Patent No.: US 12,473,268 B2
(45) Date of Patent: Nov. 18, 2025

(54) SOLID STATE FORMS OF BLARCAMESINE SALTS

(71) Applicant: ASSIA CHEMICAL INDUSTRIES LTD., Tel Aviv (IL)

(72) Inventors: Polina Lapido, Rishon LeZion (IL); Jenny Goldshtein, Netanya (IL)

(73) Assignee: ASSIA CHEMICAL INDUSTRIES, LTD., Tel Aviv (IL)

( * ) Notice: Subject to any disclaimer, the term of this patent is extended or adjusted under 35 U.S.C. 154(b) by 665 days.

(21) Appl. No.: 17/796,704

(22) PCT Filed: Feb. 3, 2021

(86) PCT No.: PCT/US2021/016296
§ 371 (c)(1),
(2) Date: Aug. 1, 2022

(87) PCT Pub. No.: WO2021/158586
PCT Pub. Date: Aug. 12, 2021

(65) Prior Publication Data
US 2023/0058102 A1    Feb. 23, 2023

Related U.S. Application Data

(60) Provisional application No. 62/969,697, filed on Feb. 4, 2020, provisional application No. 62/986,848, filed on Mar. 9, 2020, provisional application No. 62/986,852, filed on Mar. 9, 2020.

(51) Int. Cl.
*C07D 307/14* (2006.01)

(52) U.S. Cl.
CPC ........ *C07D 307/14* (2013.01); *C07B 2200/13* (2013.01)

(58) Field of Classification Search
CPC .......................... C07D 307/14; C07B 2200/13
USPC ......................................................... 549/492
See application file for complete search history.

(56) References Cited

FOREIGN PATENT DOCUMENTS

WO    2019200345 A1    10/2019

OTHER PUBLICATIONS

Stahl, et al. "Handbook of Pharmaceutical Salts Properties, Selection, and Use", (2002) International Union of Pure and Applied Chemistry (IUPAC), XP003024996, pp. 212-217.
D. Giron, "Characterisation of Salts of Drug Substances", Journal of Thermal Analysis And Calorimetry, vol. 73 (2003), pp. 441-457, XP019254693.
International Search Report and Written Opinion of the International Searching Authority issued in corresponding application PCT/US2021/016296 mailed May 3, 2021 (20 pages).

*Primary Examiner* — Kristin A Vajda
(74) *Attorney, Agent, or Firm* — Carter, DeLuca & Farrell, LLP

(57) ABSTRACT

The present disclosure encompasses a novel solid state form of Blarcamesine and salts thereof, processes for preparation thereof, and pharmaceutical compositions thereof.

18 Claims, 28 Drawing Sheets

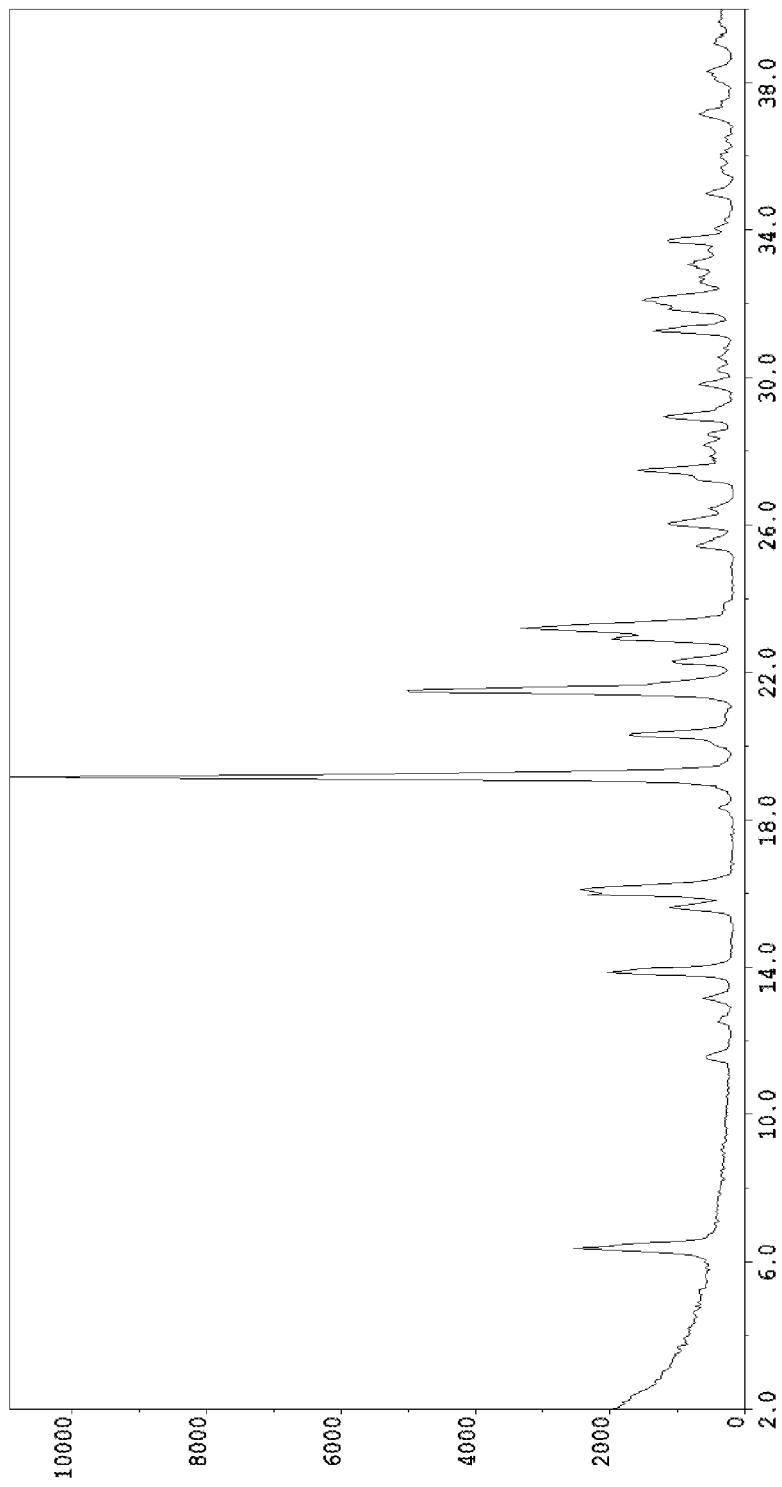
Figure 1. X-ray powder diffraction pattern (XRPD) of Form A of Blarcamesine HBr

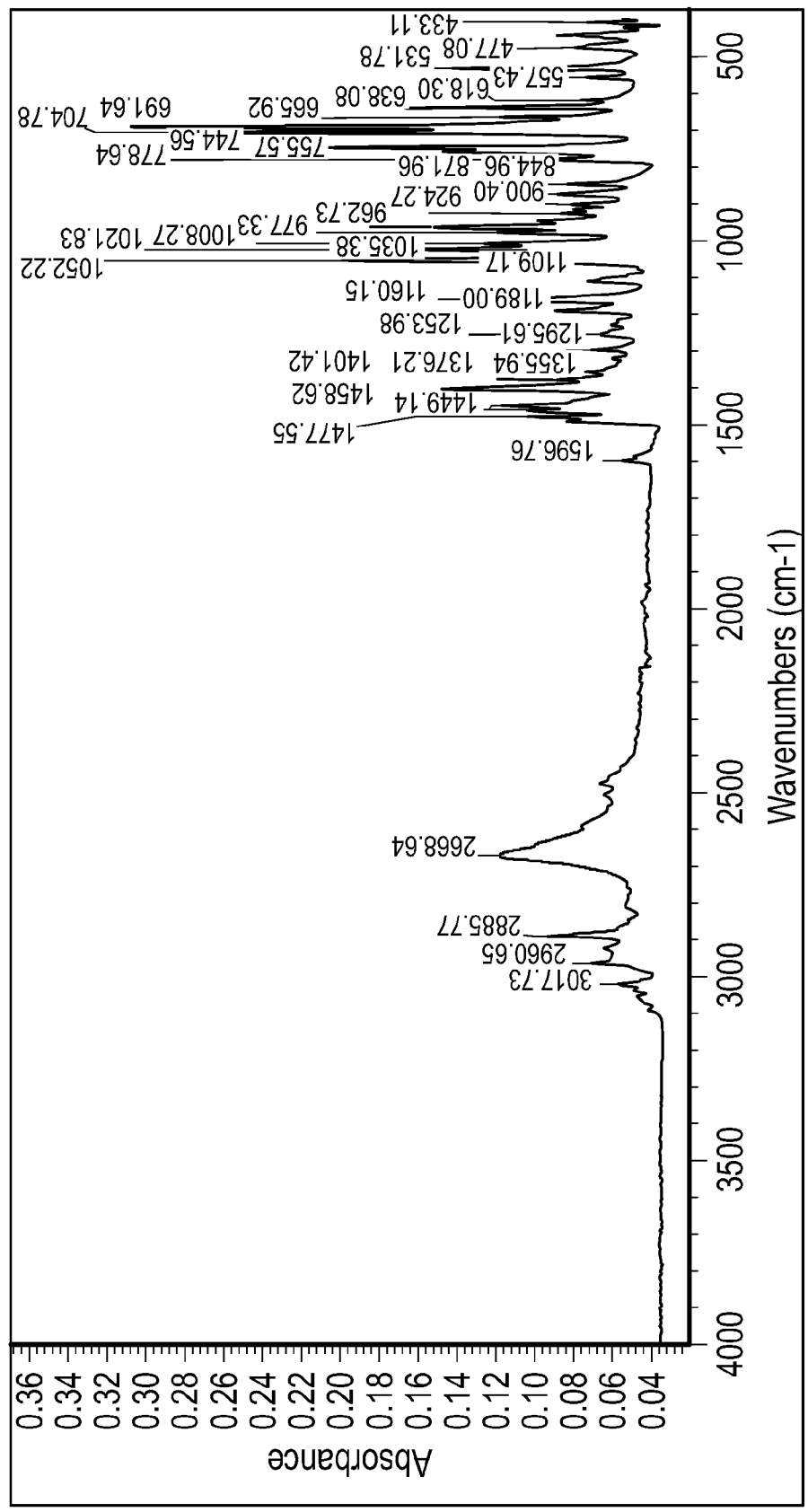
Figure 2. A characteristic FTIR spectrum of Form A of Blarcamesine HBr

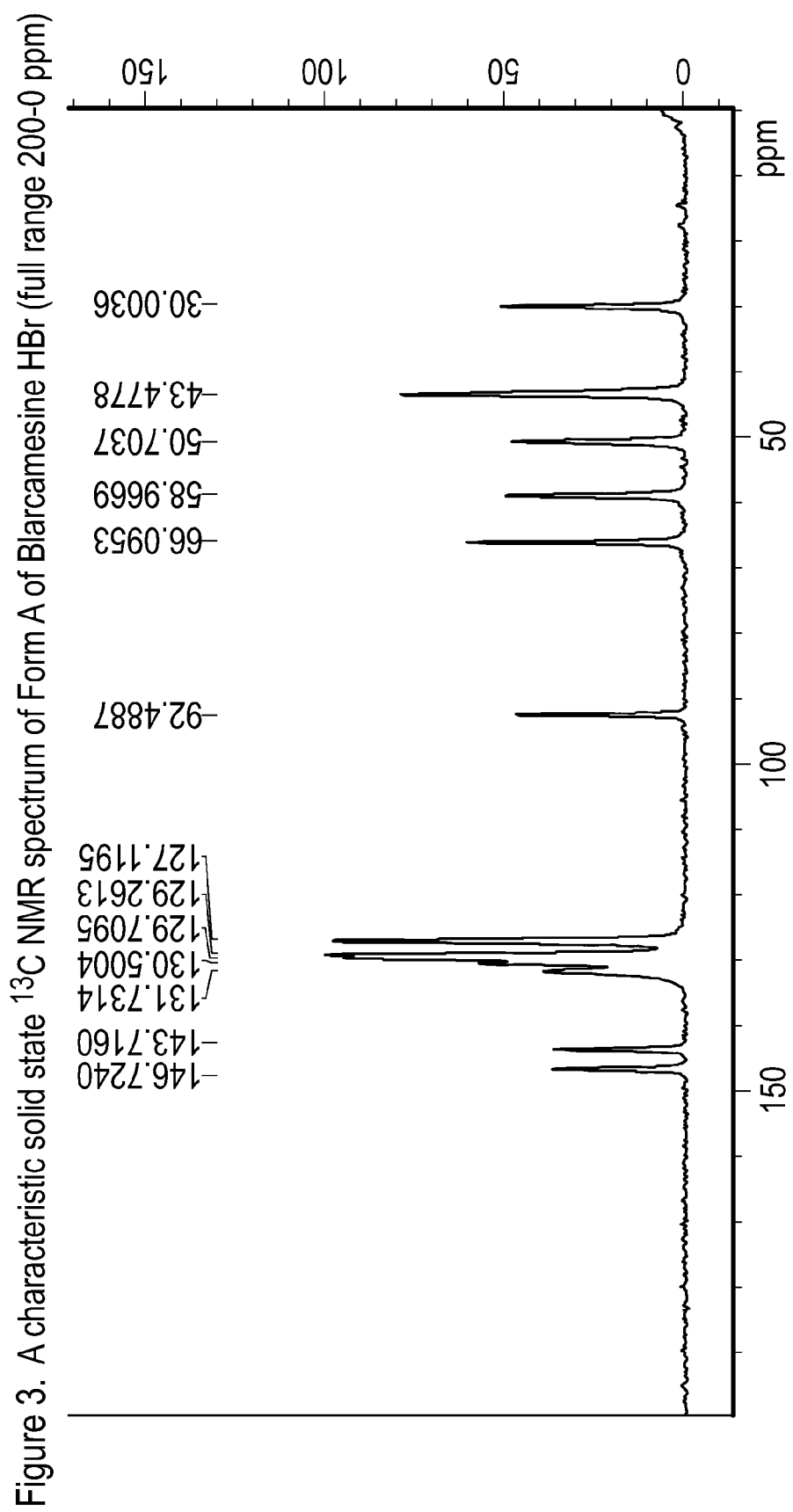
Figure 3. A characteristic solid state $^{13}$C NMR spectrum of Form A of Blarcamesine HBr (full range 200-0 ppm)

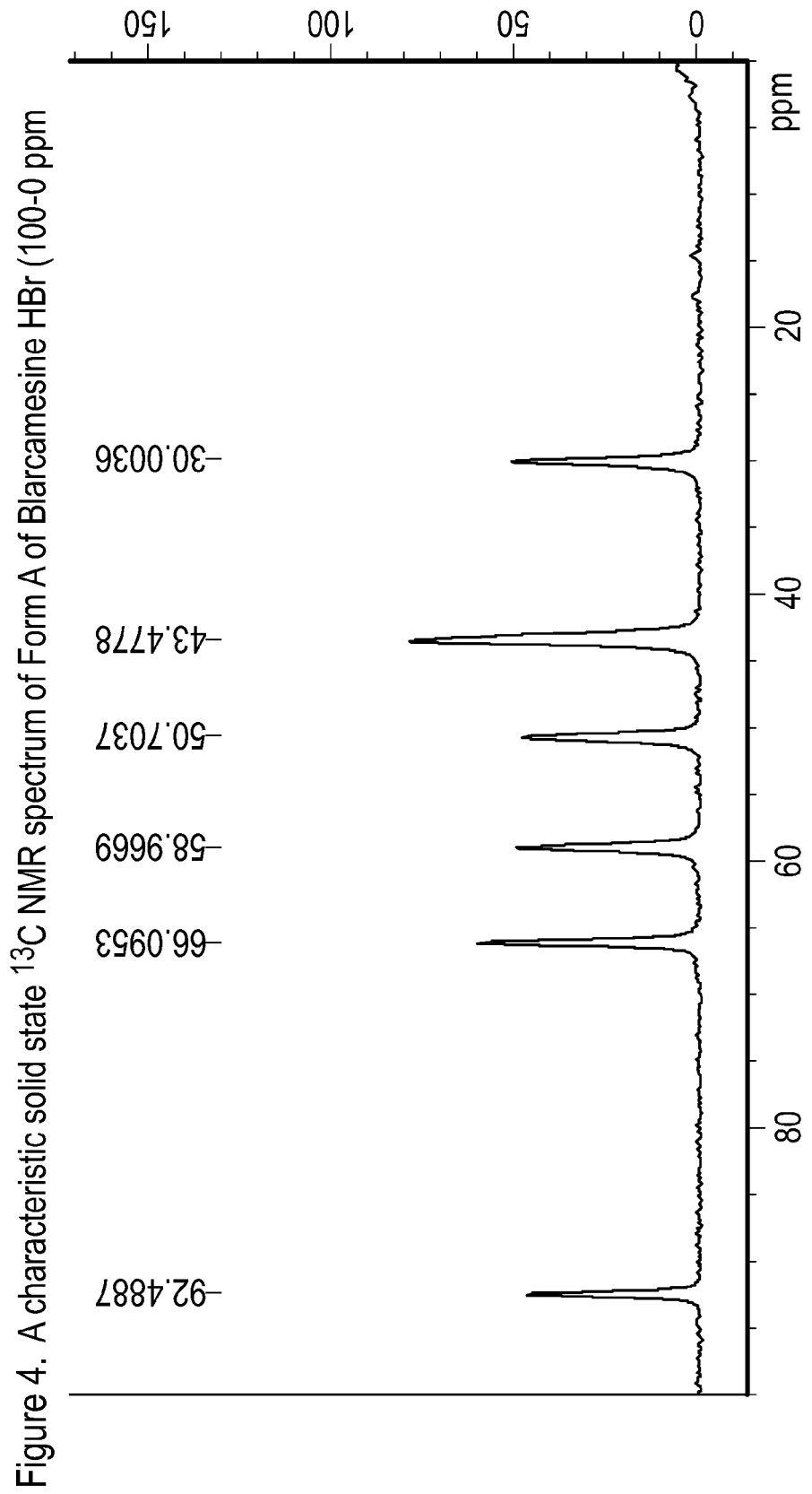
Figure 4. A characteristic solid state $^{13}$C NMR spectrum of Form A of Blarcamesine HBr (100-0 ppm)

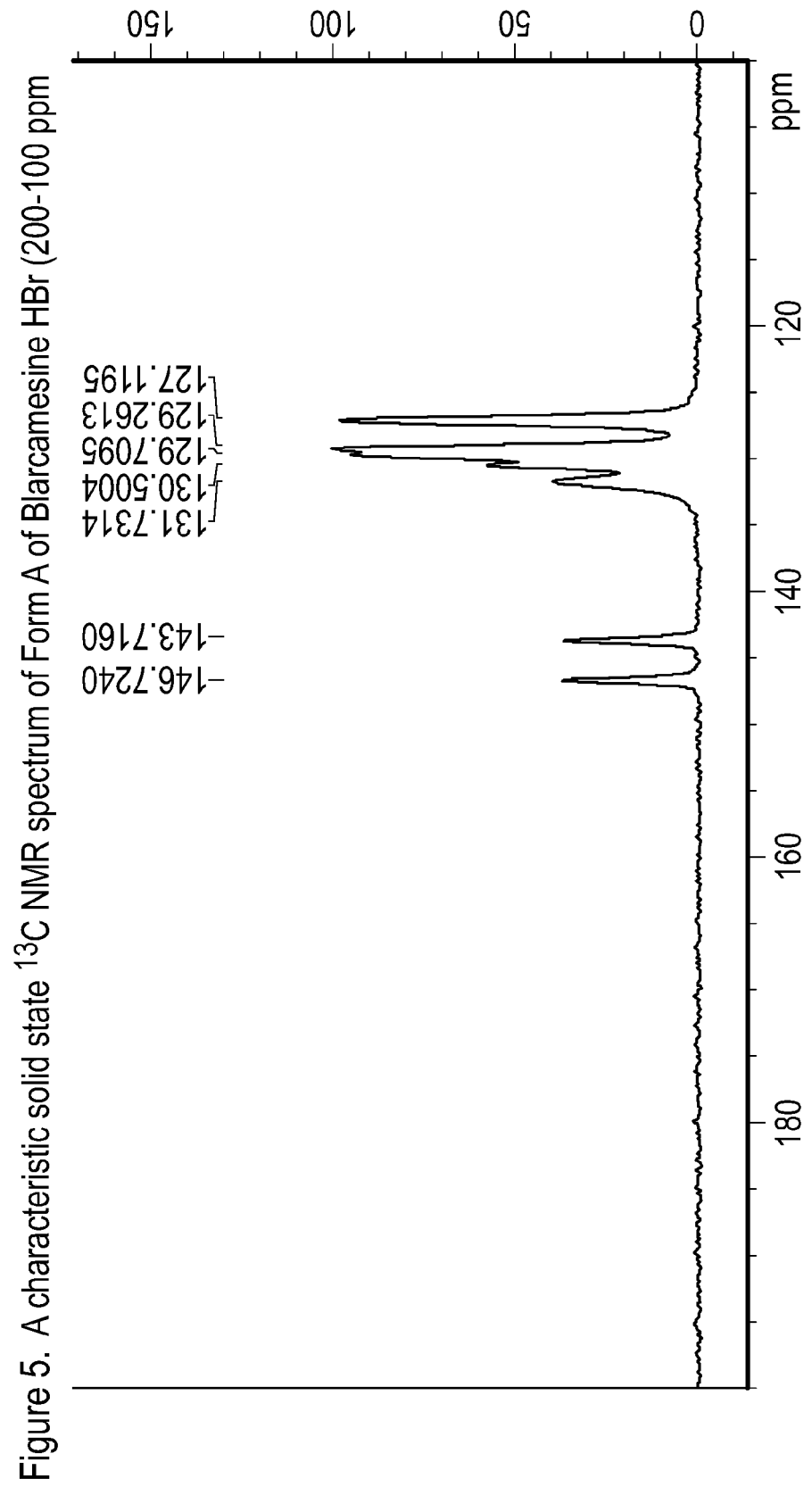
Figure 5. A characteristic solid state ¹³C NMR spectrum of Form A of Blarcamesine HBr (200-100 ppm)

Figure 6. A scanning electron microscopy (SEM) image of Particles of Form A of Blarcamesine HBr (X750 magnification and X1500 magnification)
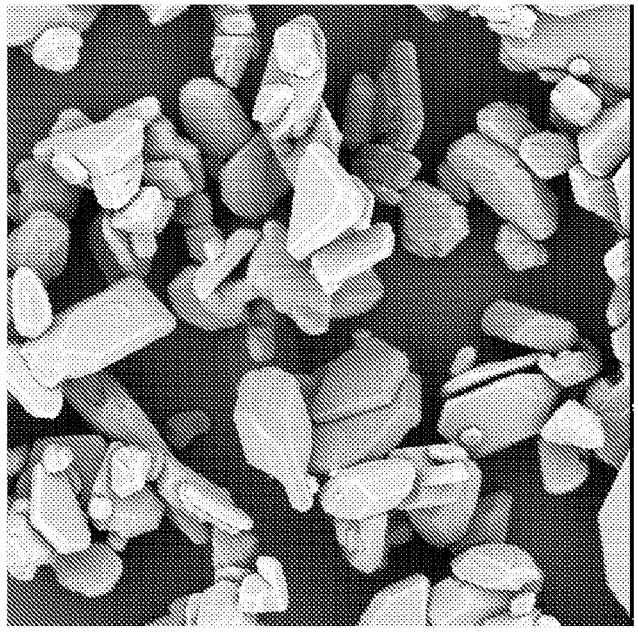
X1500
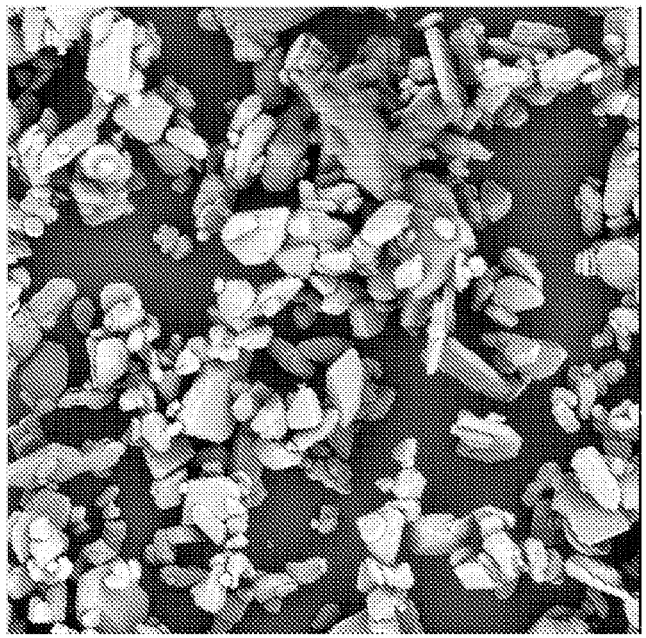
X750

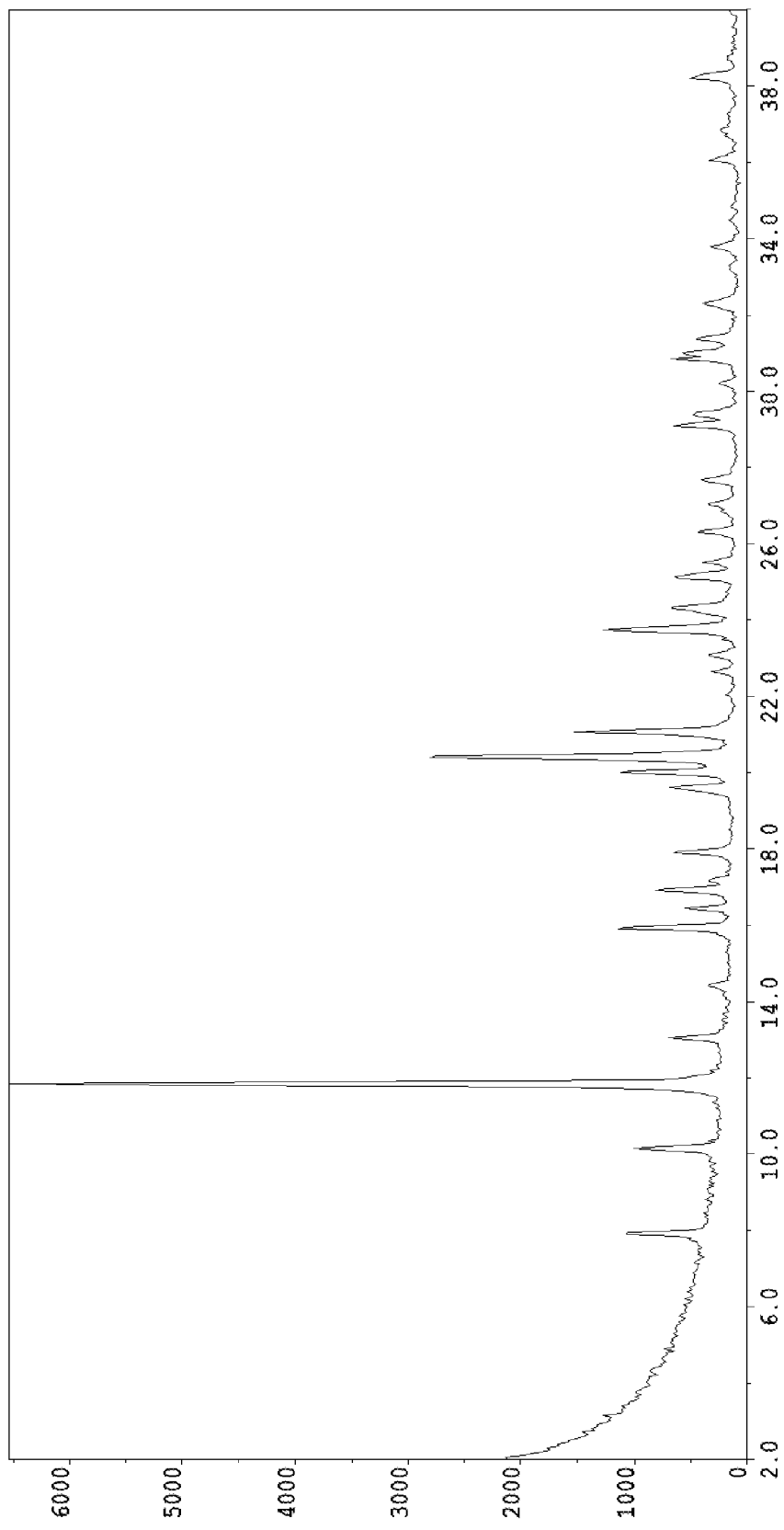
Figure 7. X-ray powder diffraction pattern (XRPD) of Form B of Blarcamesine HBr

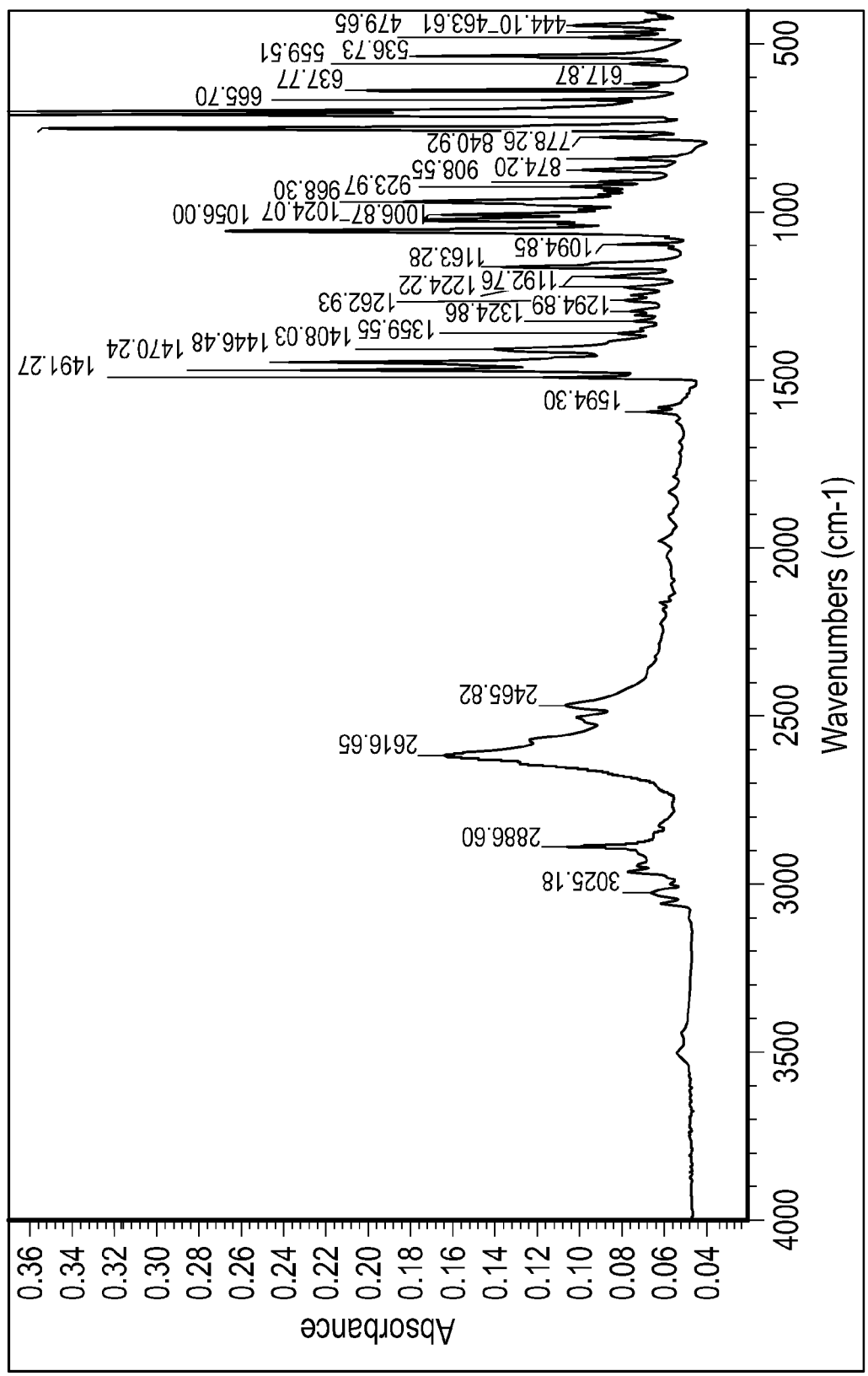
Figure 8. A characteristic FTIR spectrum of Form B of Blarcamesine HBr

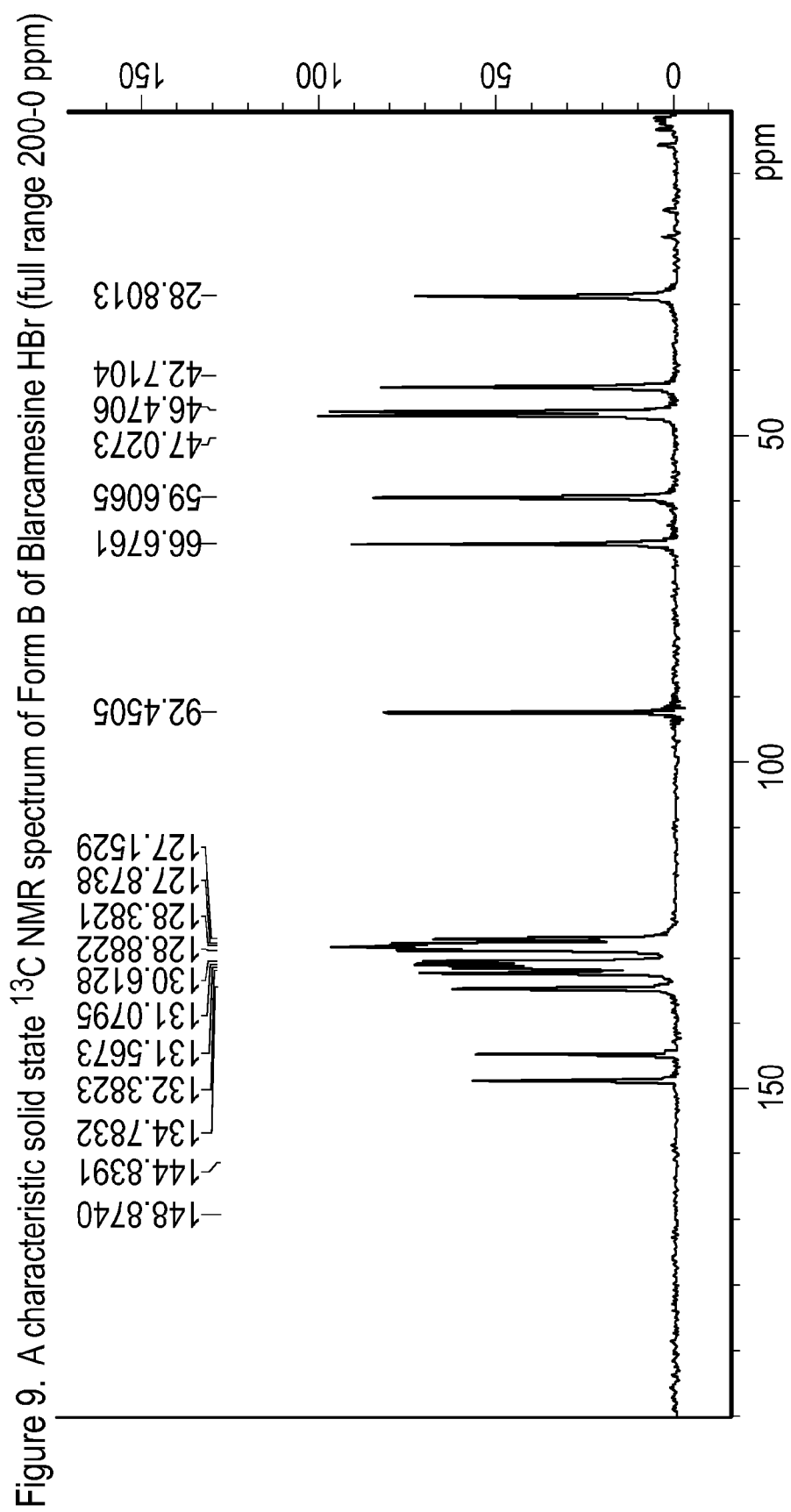
Figure 9. A characteristic solid state ¹³C NMR spectrum of Form B of Blarcamesine HBr (full range 200-0 ppm)

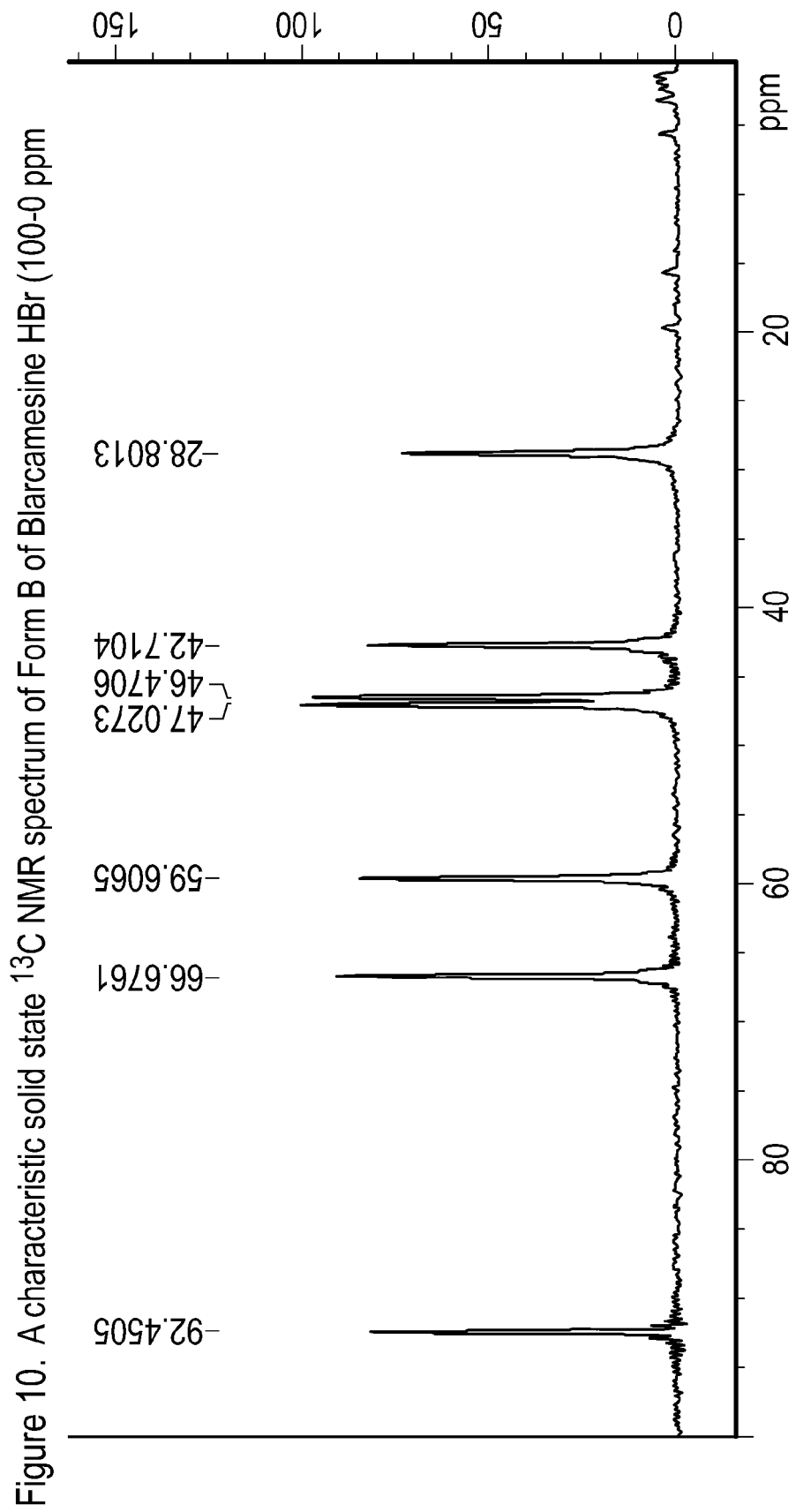
Figure 10. A characteristic solid state $^{13}$C NMR spectrum of Form B of Blarcamesine HBr (100-0 ppm)

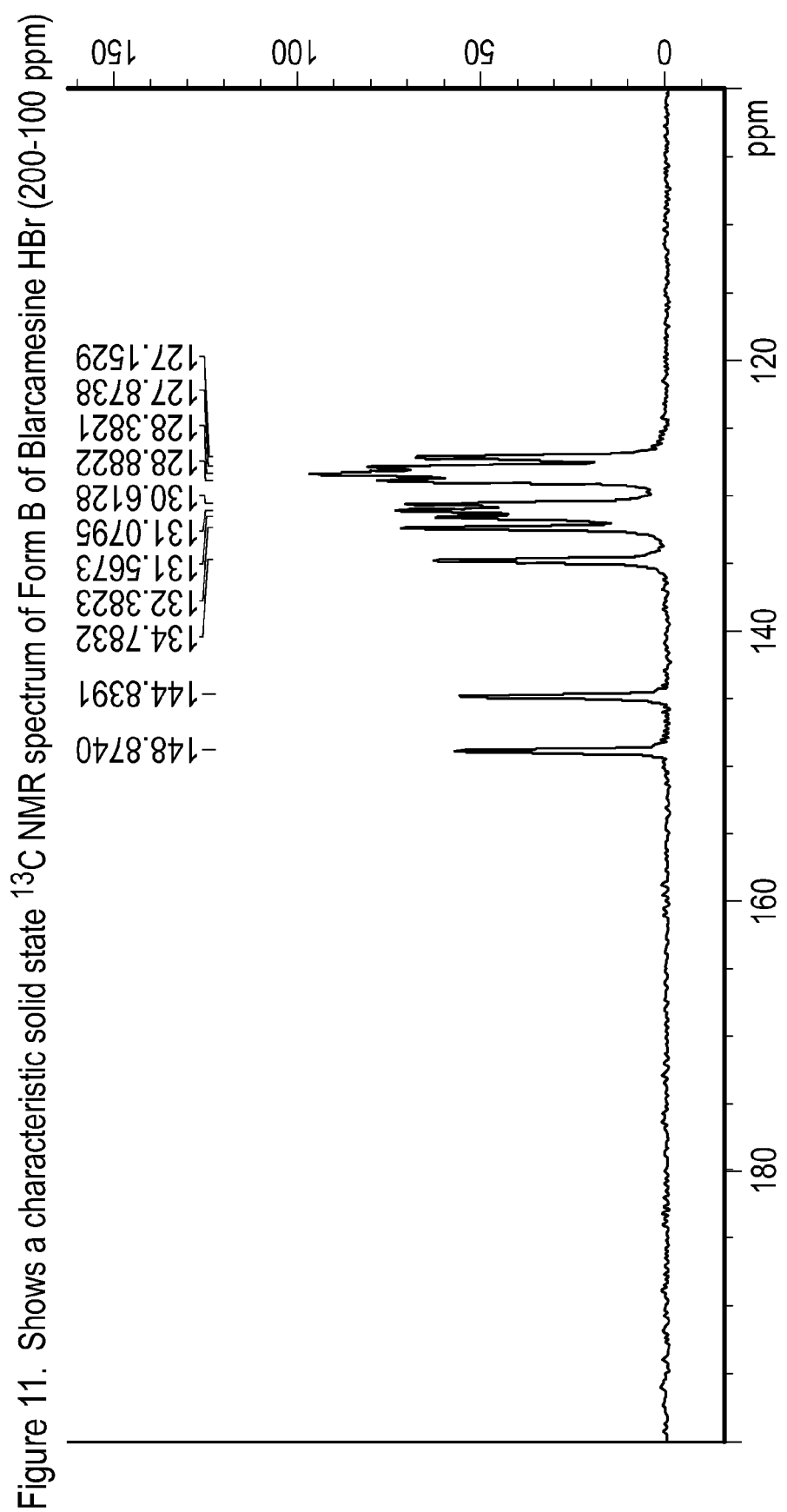
Figure 11. Shows a characteristic solid state $^{13}$C NMR spectrum of Form B of Blarcamesine HBr (200-100 ppm)

Figure 12. A scanning electron microscopy (SEM) image of Particles of Form B of Blarcamesine HBr (X750 magnification and X1500 magnification)
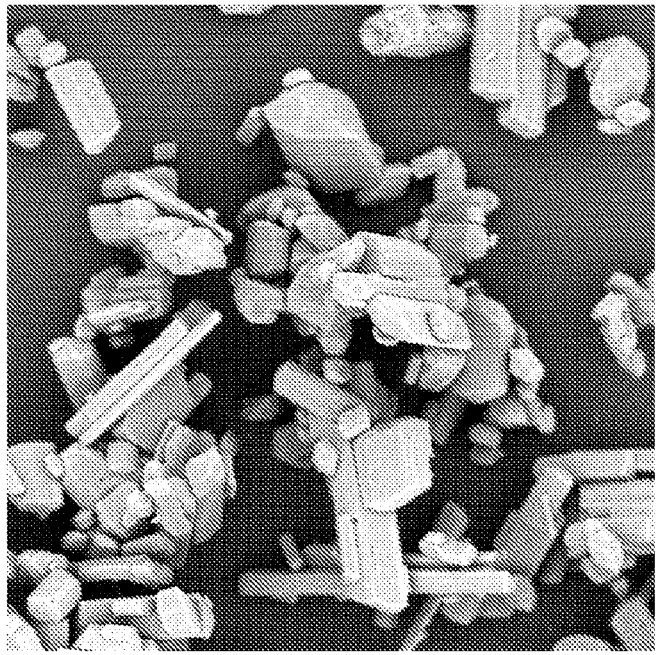
X1500
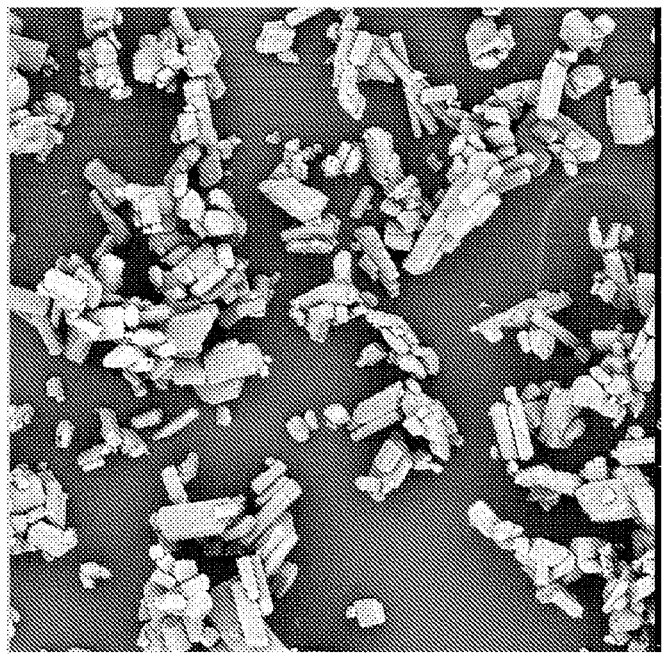
X750

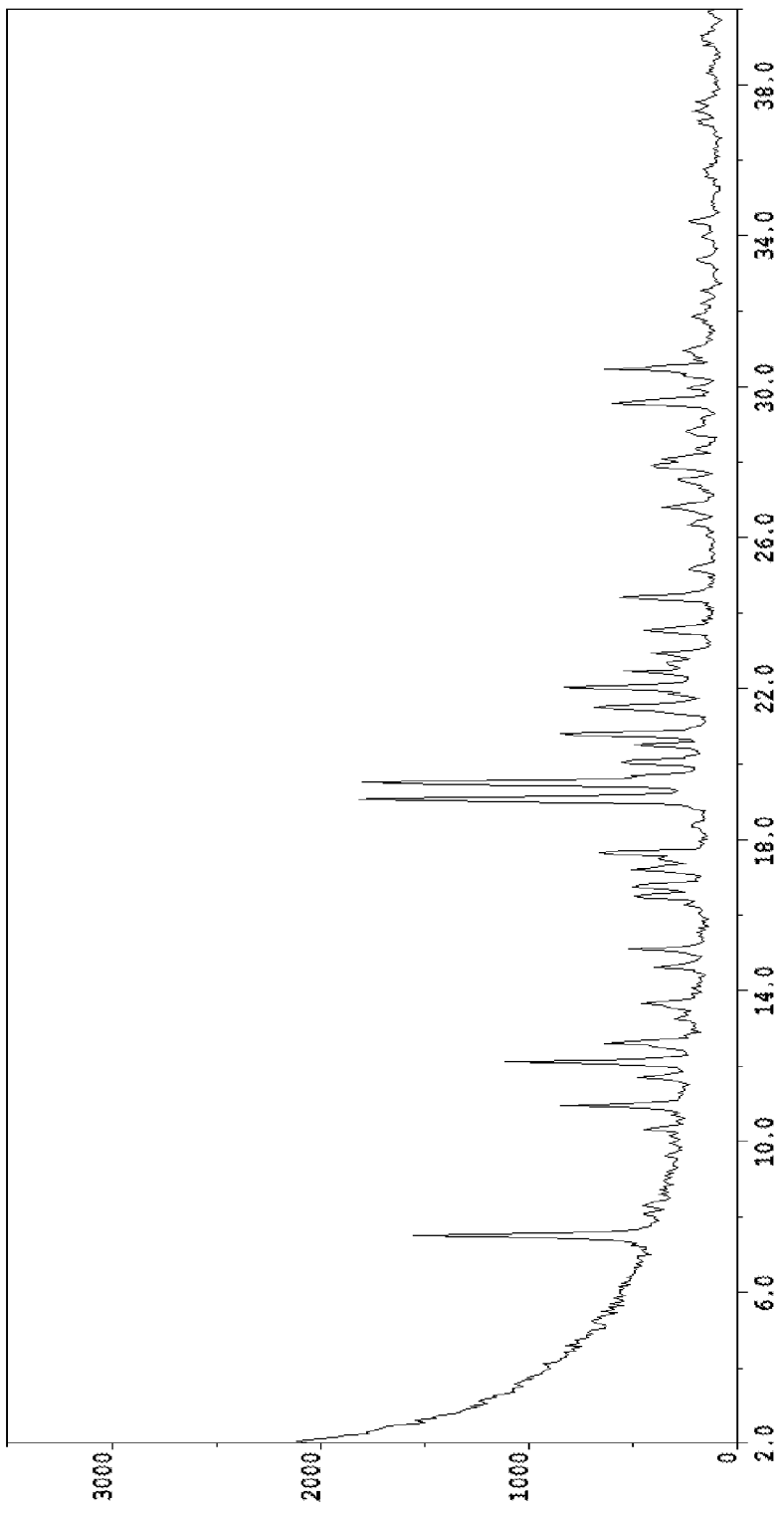
Figure 13. X-ray powder diffraction pattern (XRPD) of Form B3 of Blarcamesine HCl salt.

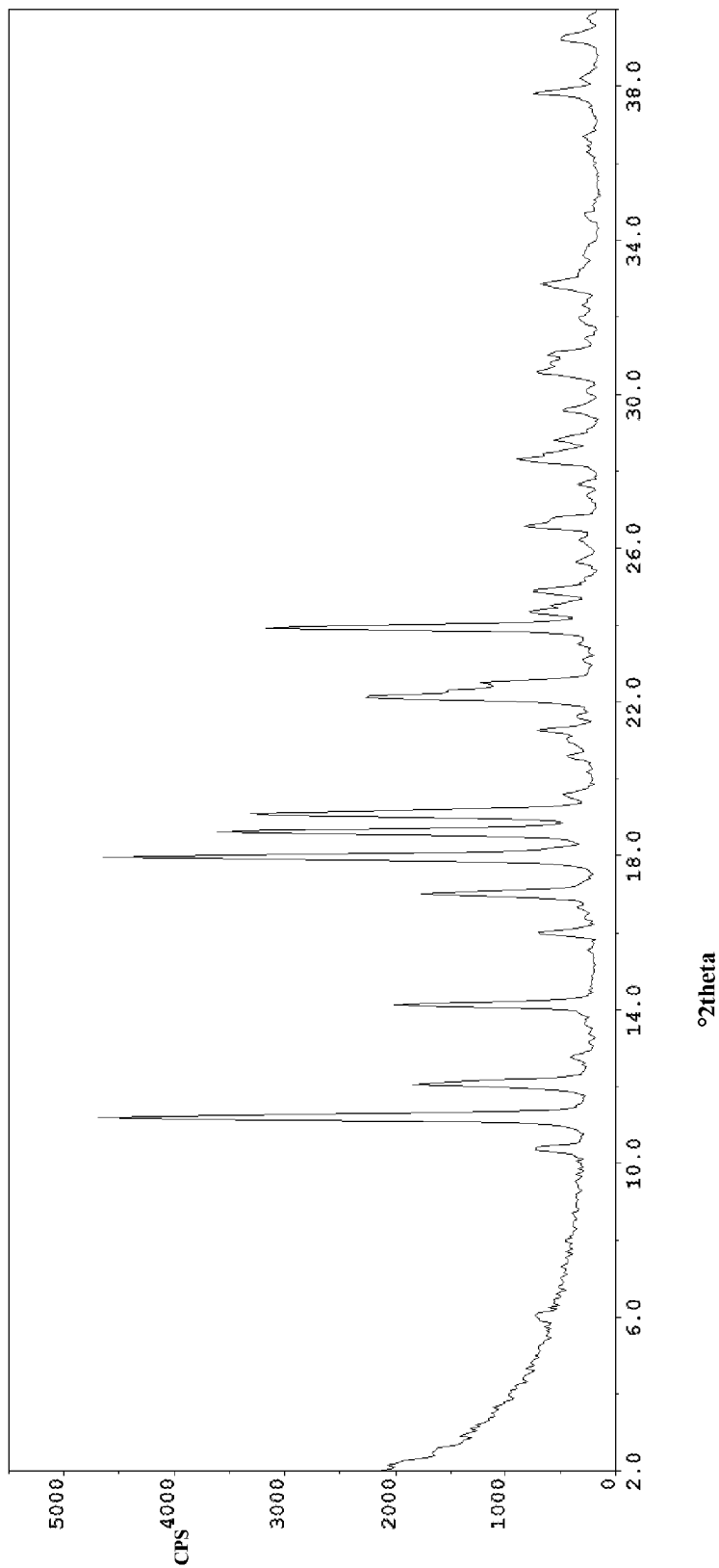
Figure 14. X-ray powder diffraction pattern (XRPD) of Form S1 of Blarcamesine Besylate.

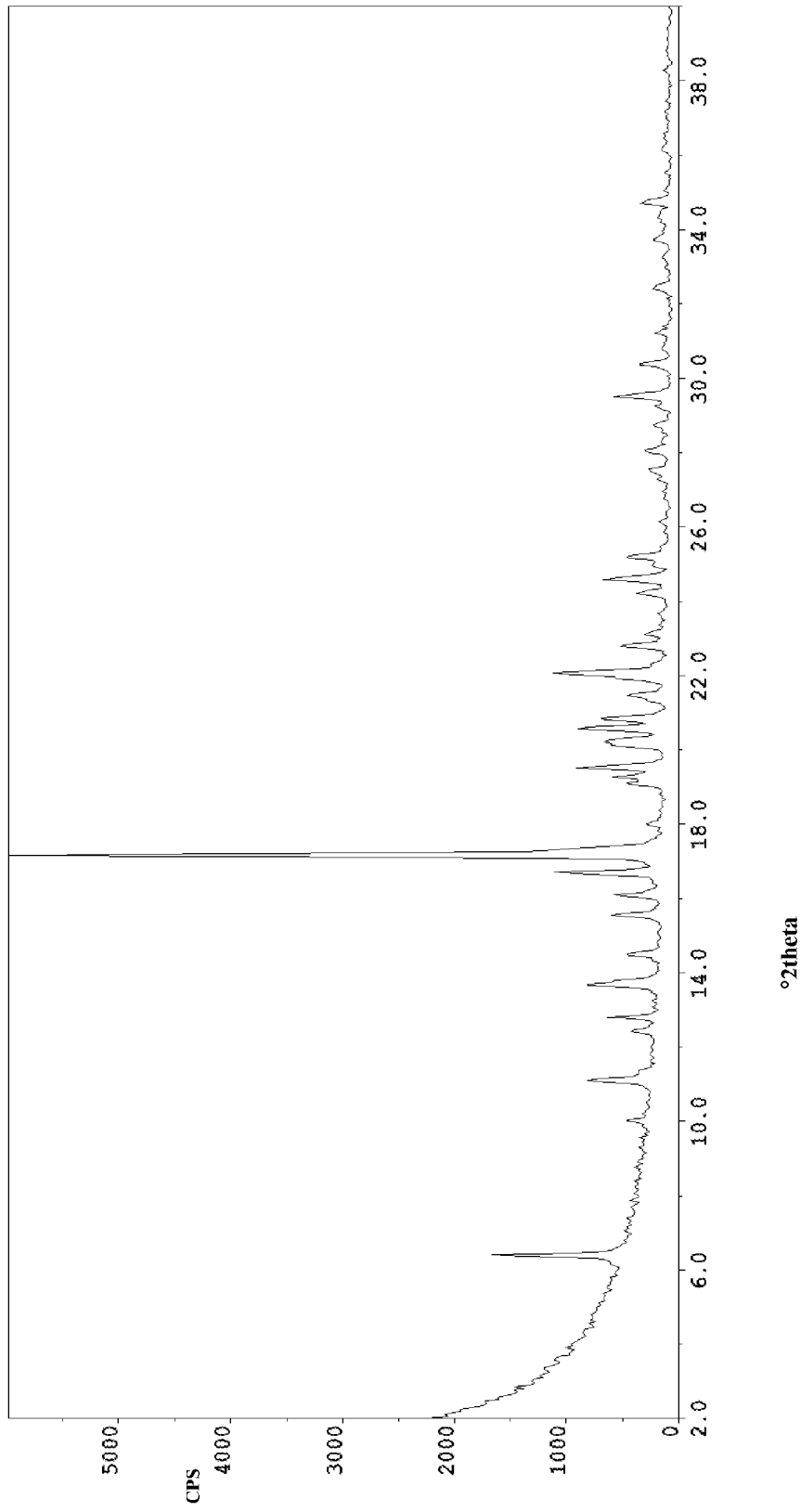
Figure 15. X-ray powder diffraction pattern XRPD of Form S2 of Blarcamesine Besylate.

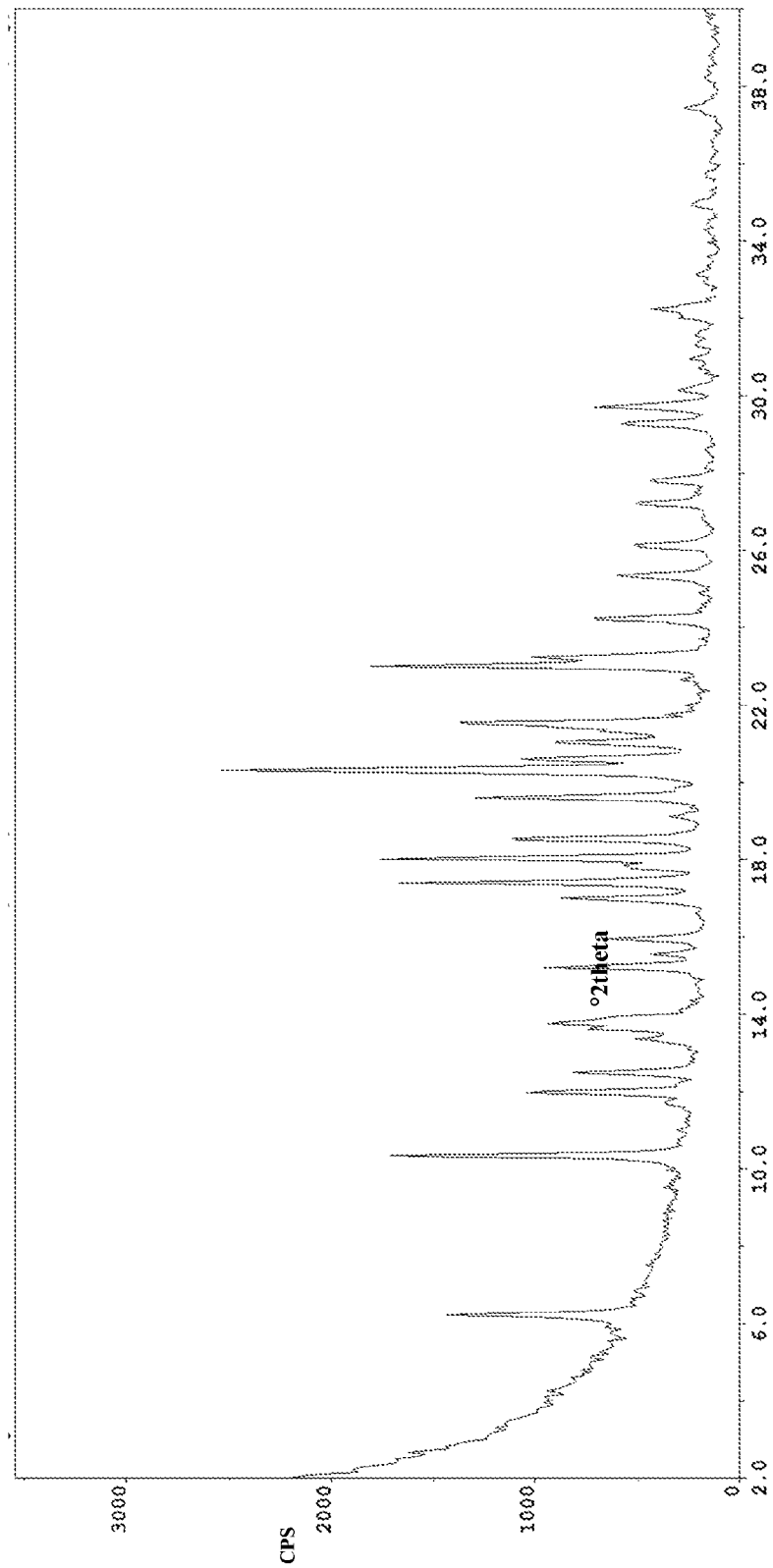
Figure 16. X-ray powder diffraction pattern (XRPD) of Form S3 of Blarcamesine Tosylate.

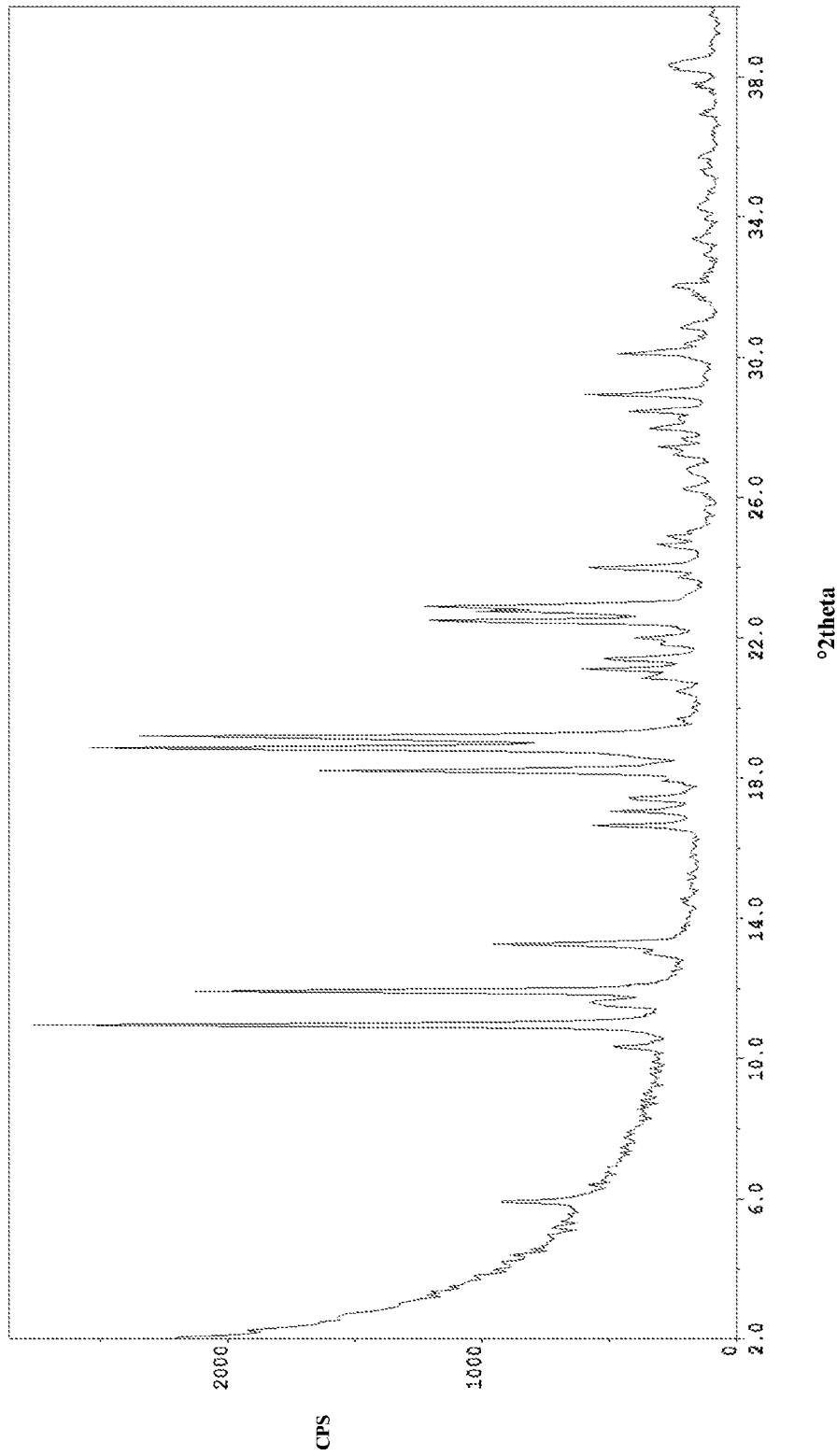
Figure 17. X-ray powder diffraction pattern (XRPD) of Form S4 of Blarcamesine Tosylate.

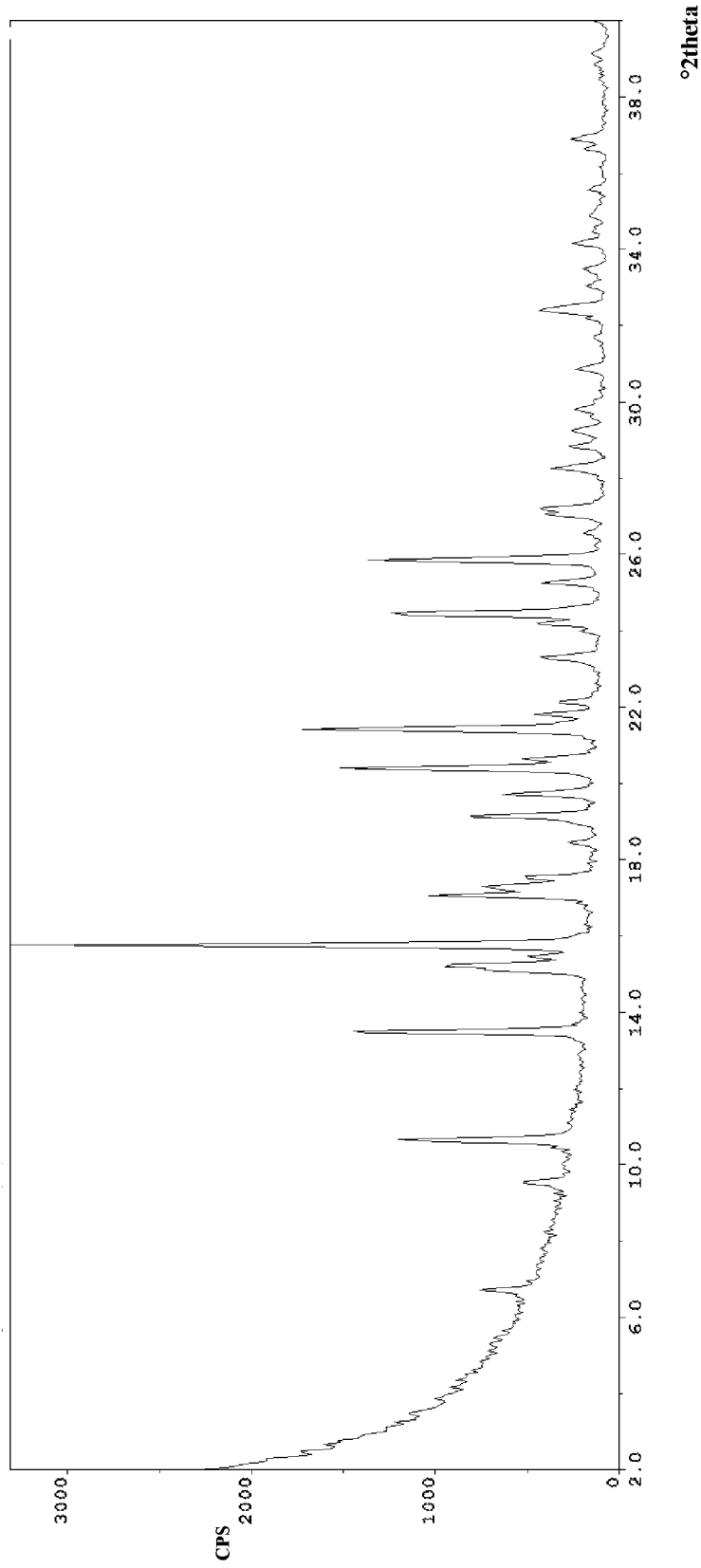
Figure 18. X-ray powder diffraction pattern (XRPD) of Form S5 of Blarcamesine Hydrogen Maleate.

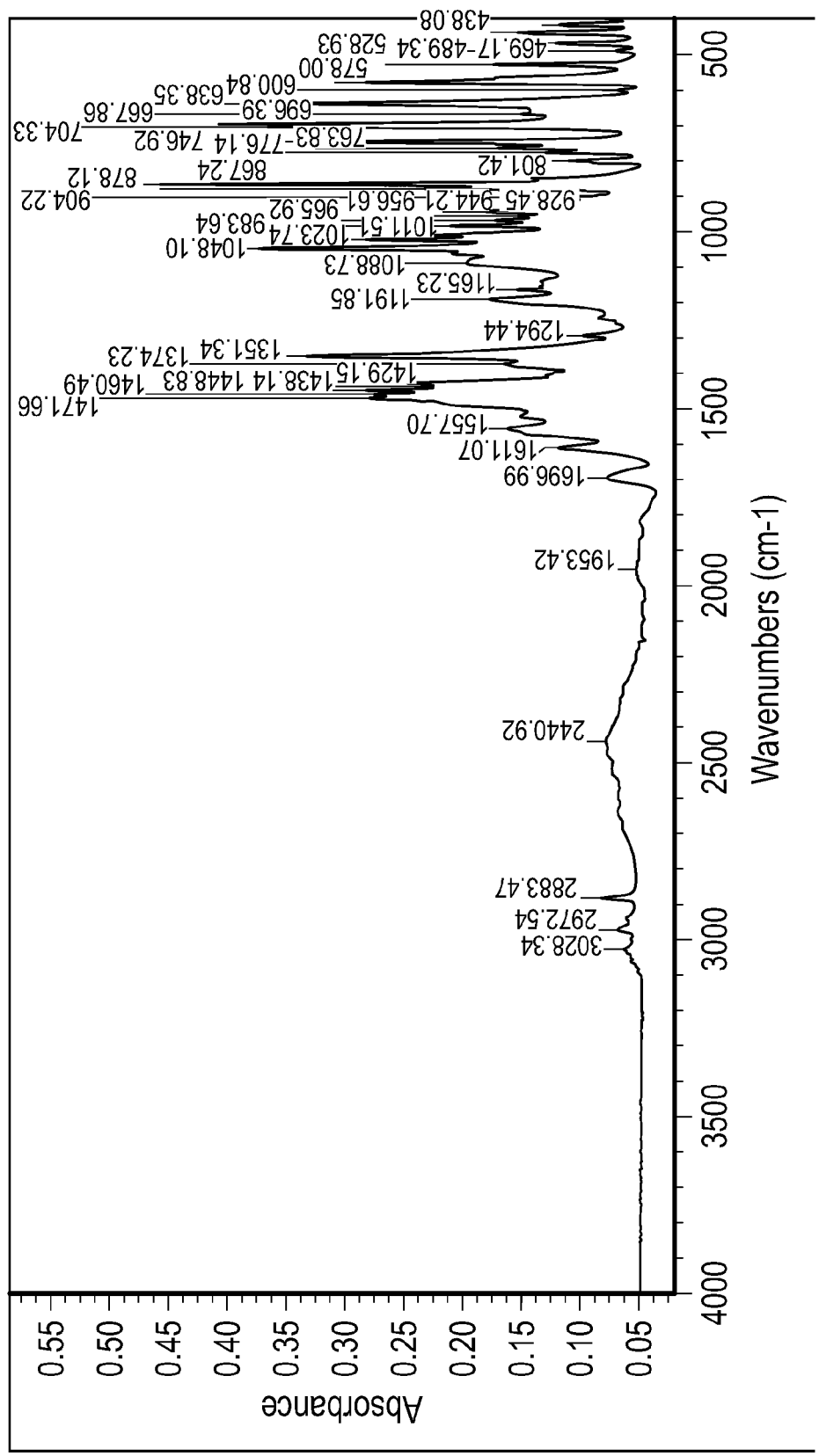
Figure 19. A characteristic FTIR spectrum of Form S5 of Blarcamesine Hydrogen Maleate

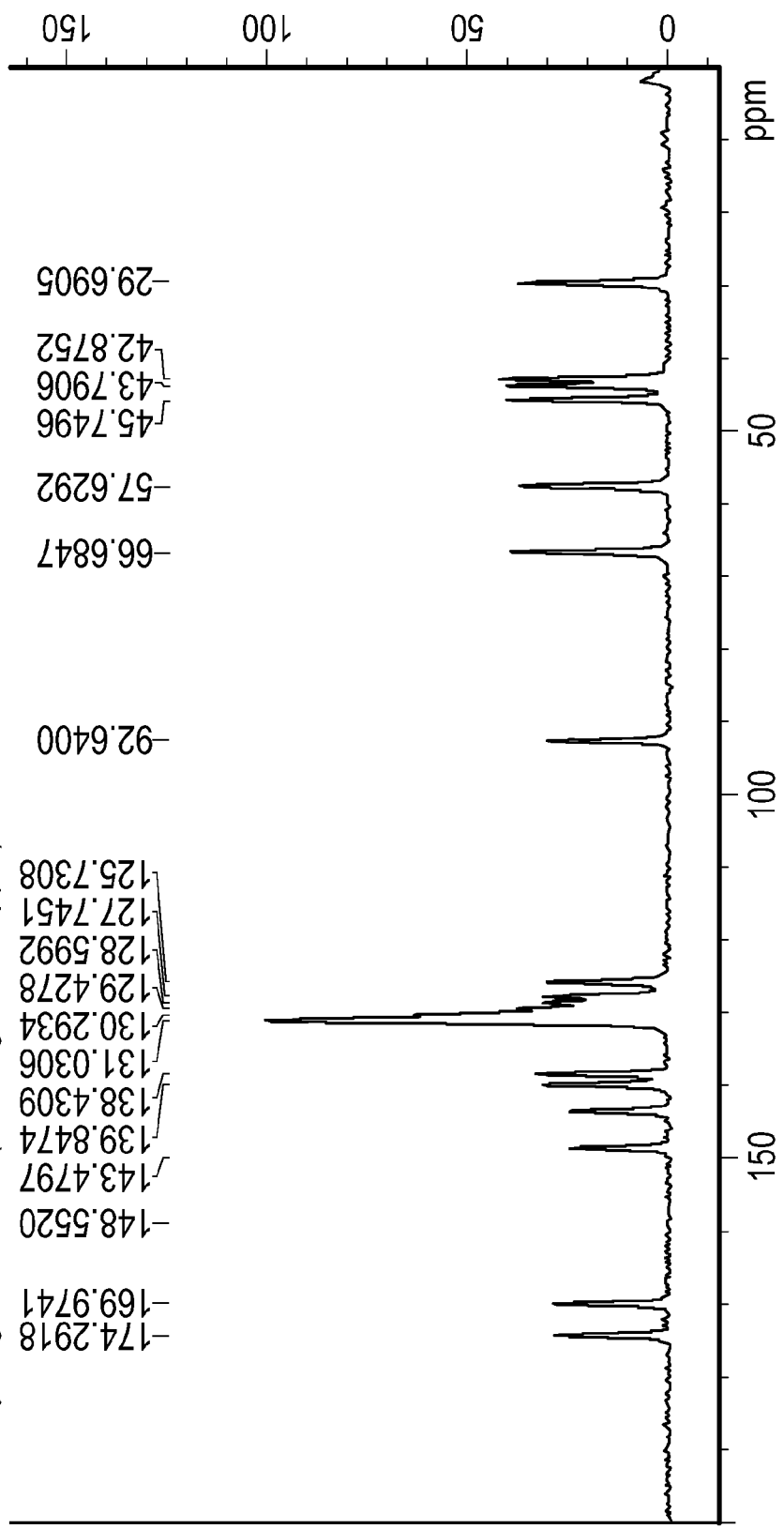
Figure 20. A characteristic solid state $^{13}$C NMR spectrum of Form S5 of Blarcamesine Hydrogen Maleate (full range 200-0 ppm)

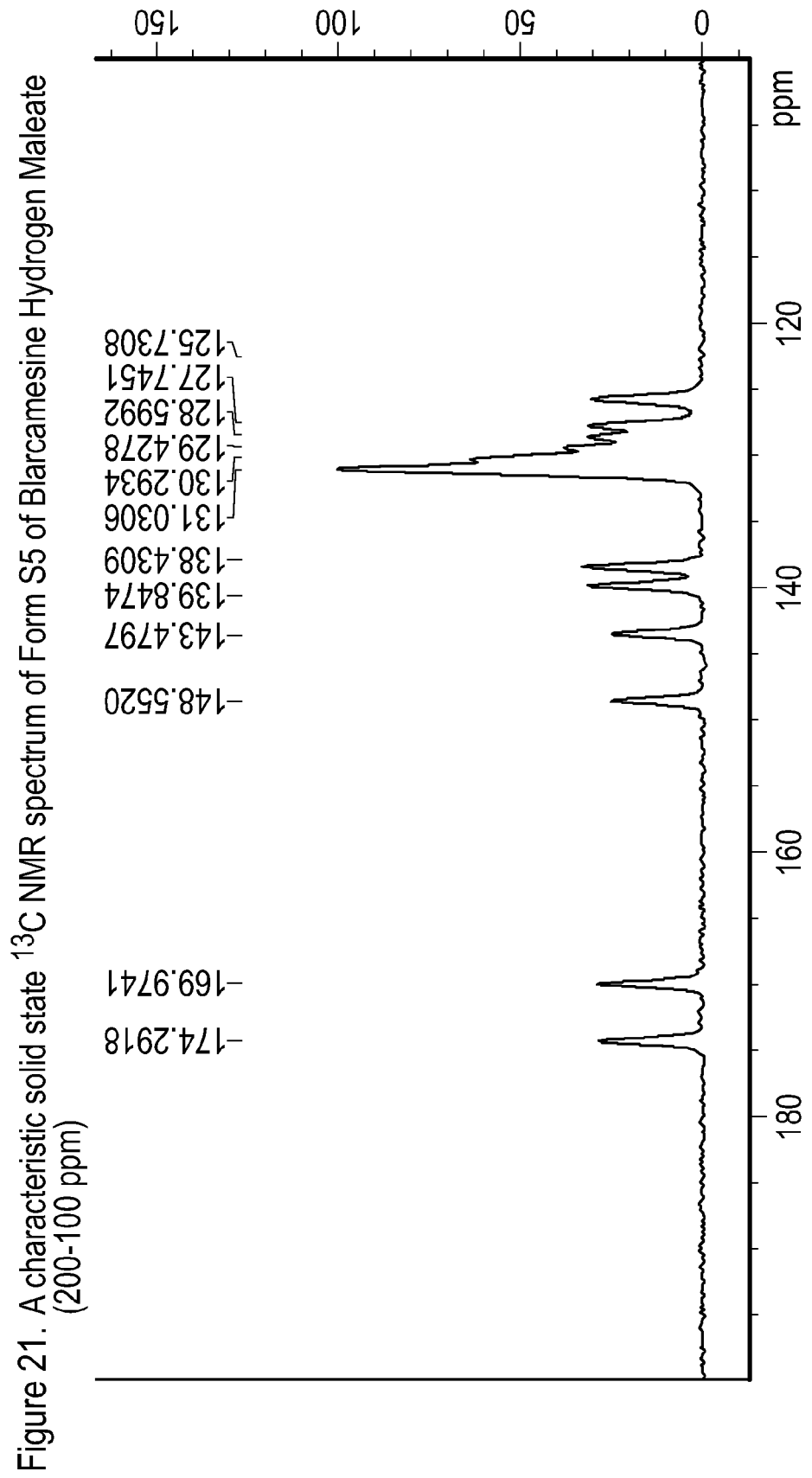
Figure 21. A characteristic solid state $^{13}$C NMR spectrum of Form S5 of Blarcamesine Hydrogen Maleate (200-100 ppm)

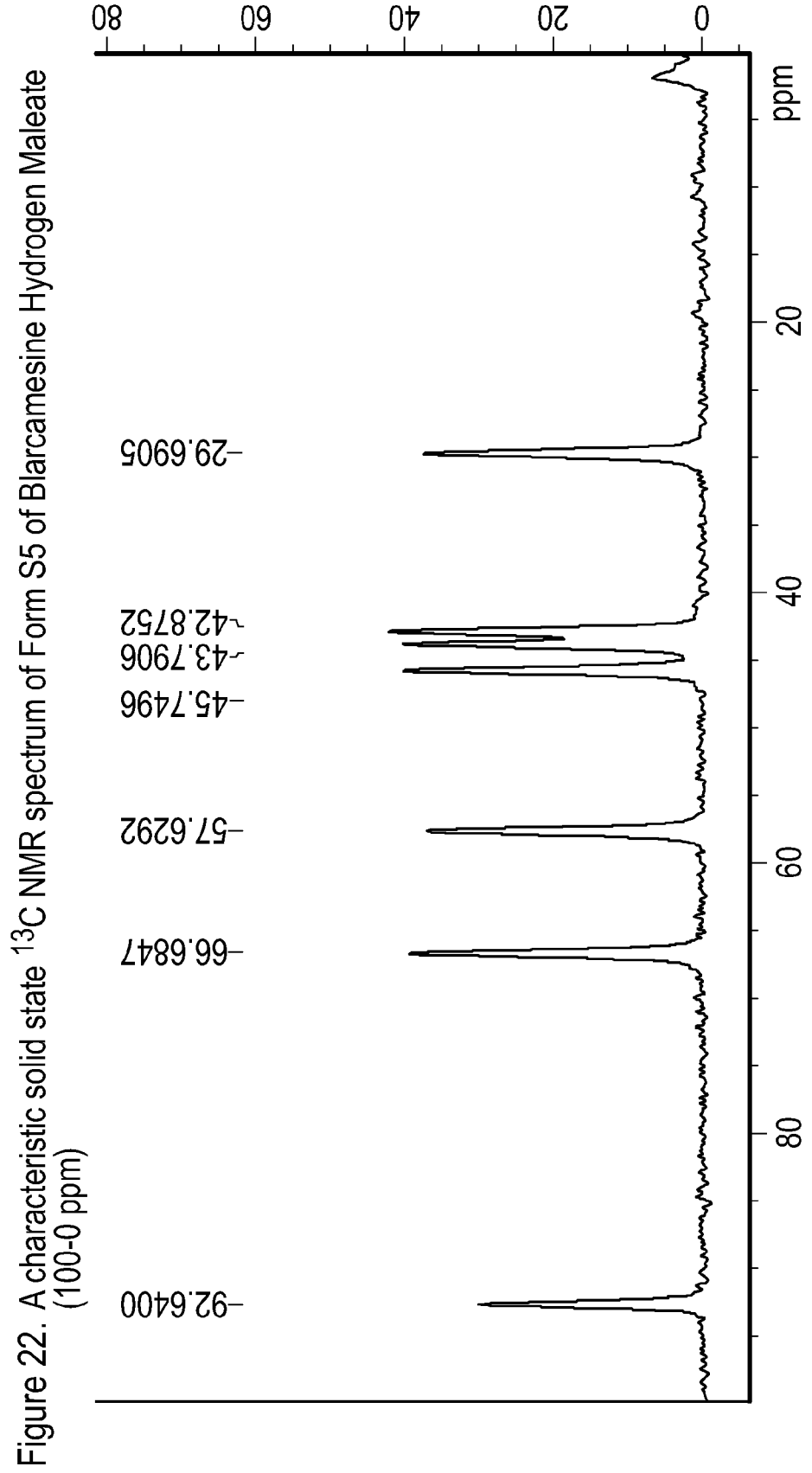
Figure 22. A characteristic solid state $^{13}$C NMR spectrum of Form S5 of Blarcamesine Hydrogen Maleate (100-0 ppm)

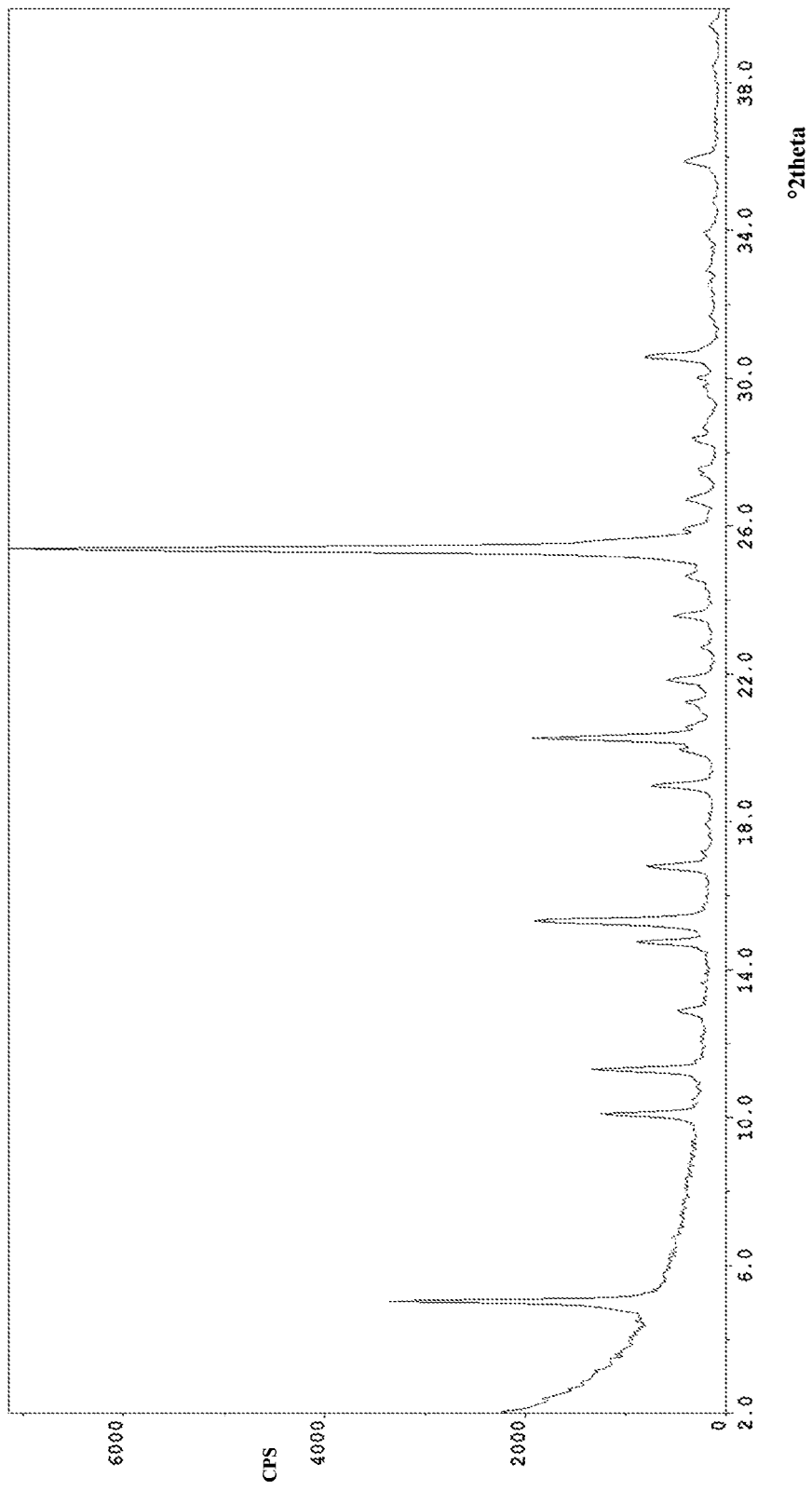
Figure 23. X-ray powder diffraction pattern (XRPD) of Form S6 of Blarcamesine Hydrogen Maleate.

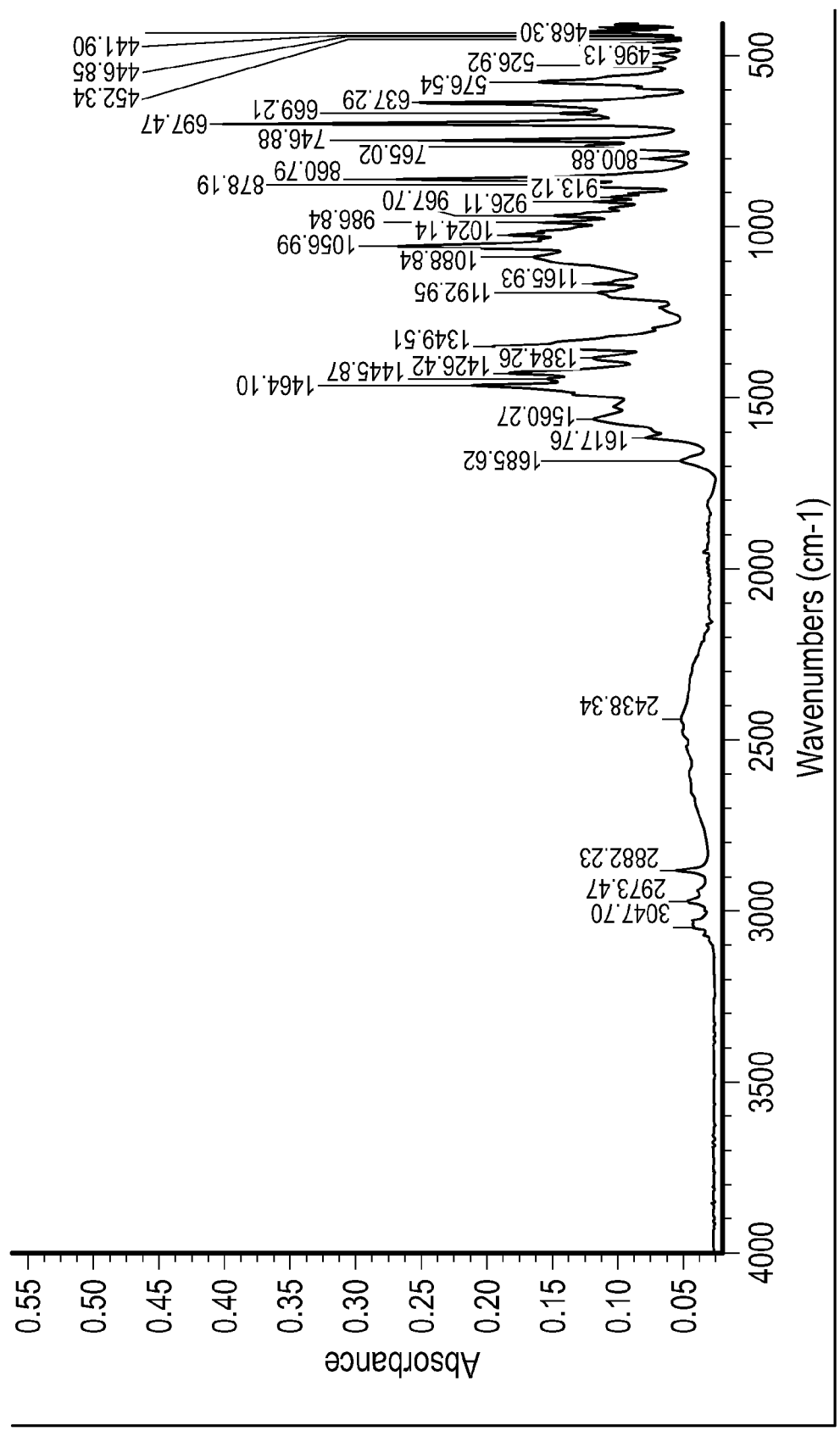
Figure 24. A characteristic FTIR spectrum of Form S6 of Blarcamesine Hydrogen Maleate

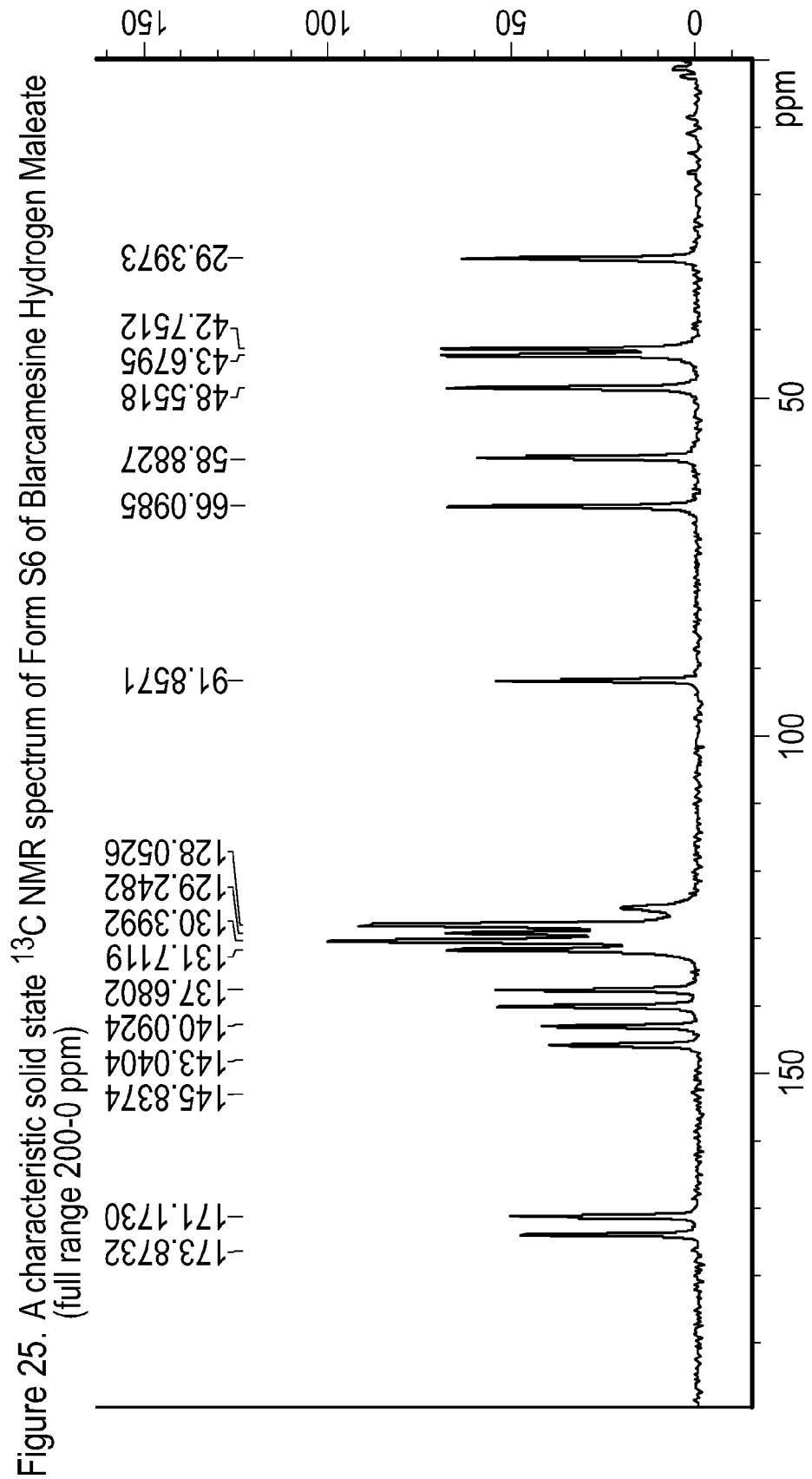
Figure 25. A characteristic solid state $^{13}$C NMR spectrum of Form S6 of Blarcamesine Hydrogen Maleate (full range 200-0 ppm)

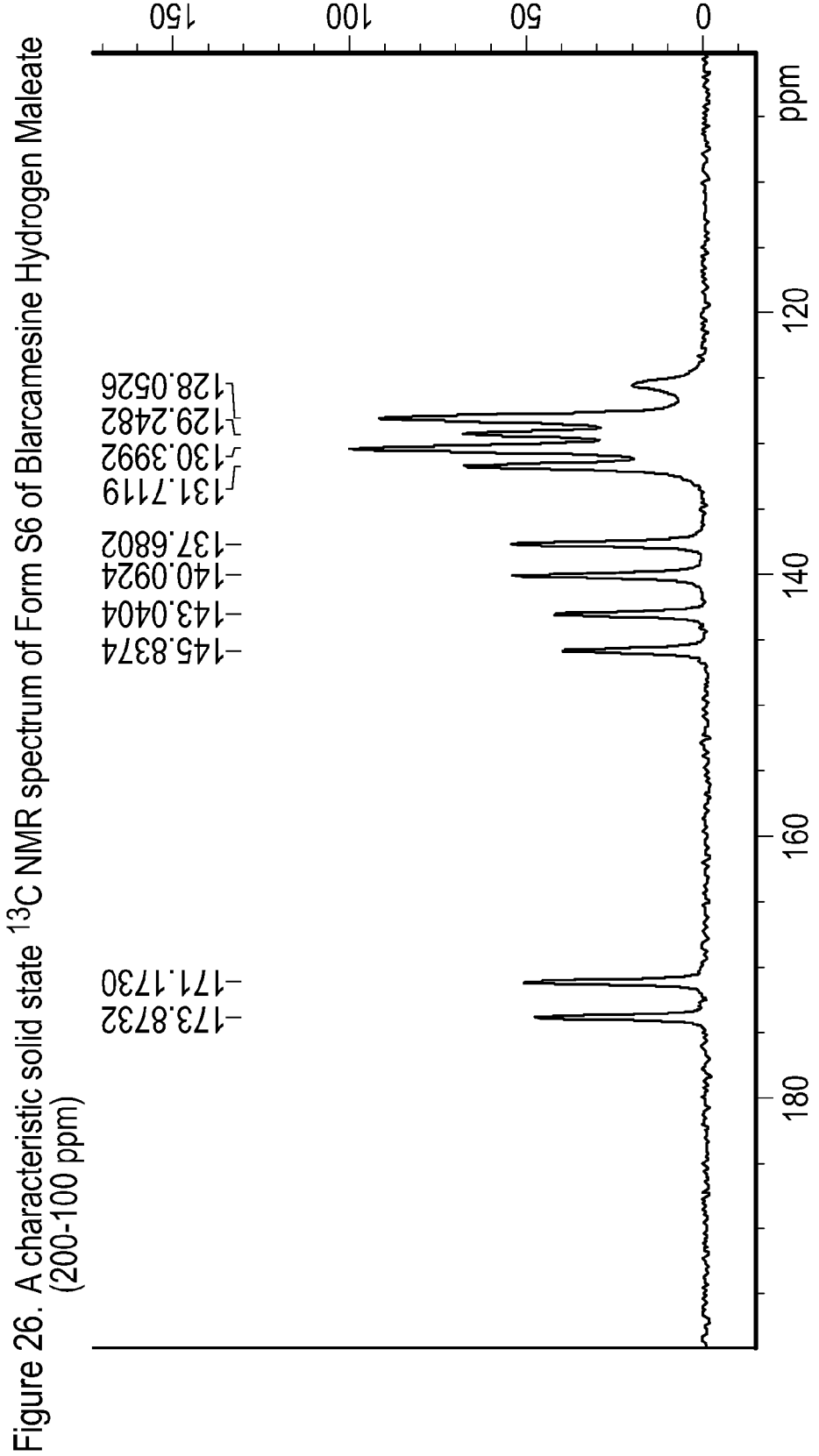
Figure 26. A characteristic solid state $^{13}$C NMR spectrum of Form S6 of Blarcamesine Hydrogen Maleate (200-100 ppm)

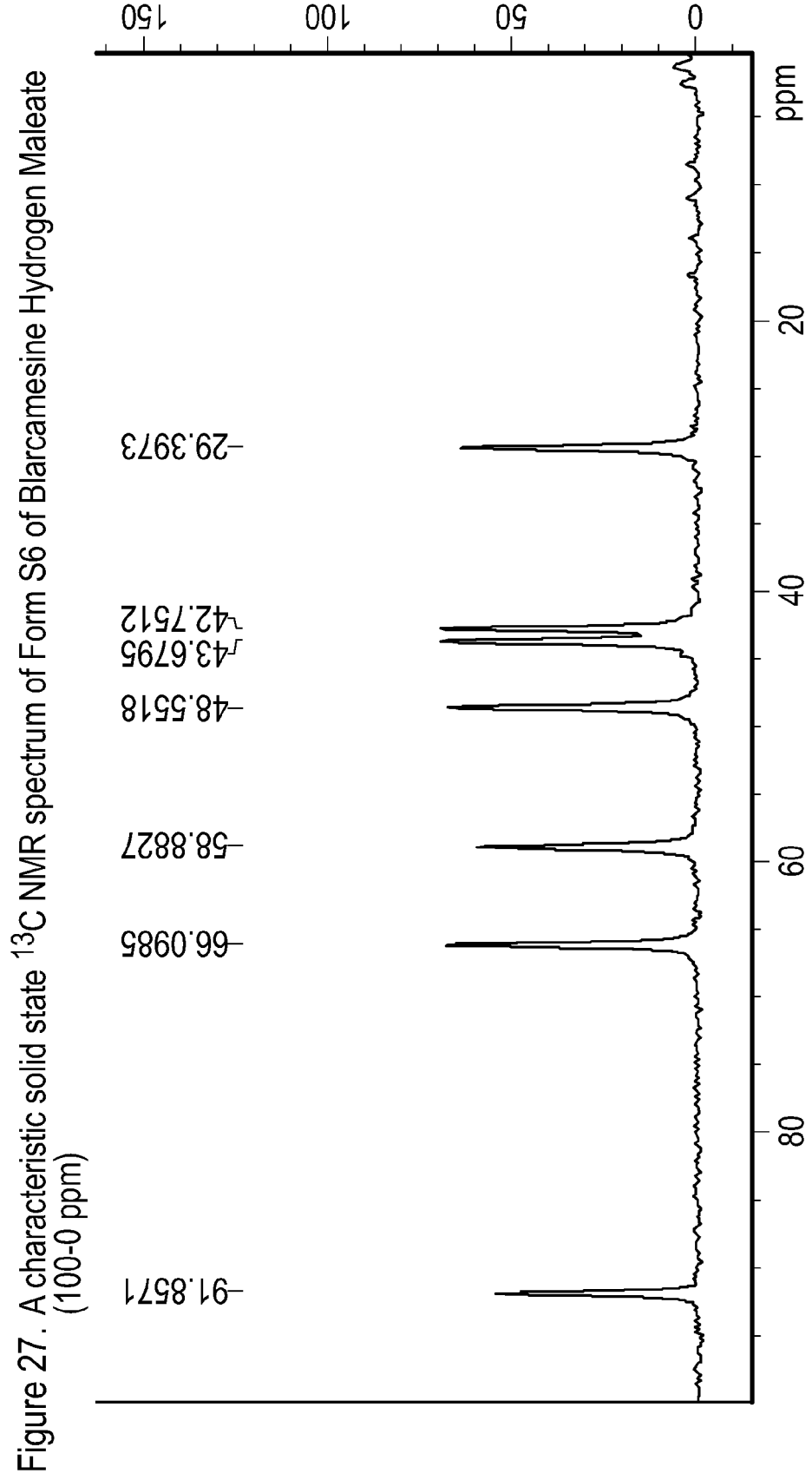
Figure 27. A characteristic solid state $^{13}$C NMR spectrum of Form S6 of Blarcamesine Hydrogen Maleate (100-0 ppm)

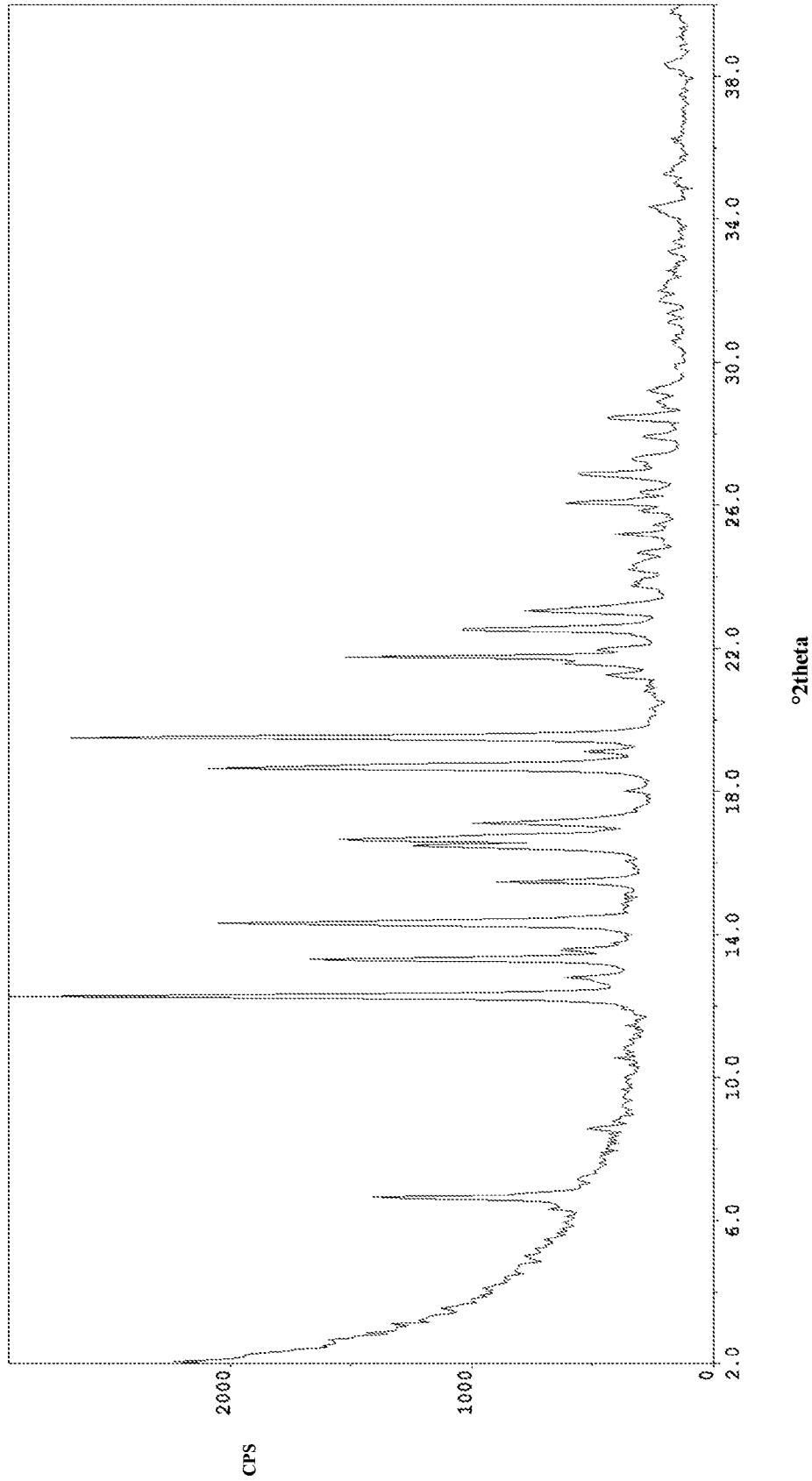
Figure 28. X-ray powder diffraction pattern (XRPD) of Form S7 of Blarcamesine Camphorsulfonate.

SOLID STATE FORMS OF BLARCAMESINE SALTS

CROSS REFERENCE TO RELATED APPLICATIONS

This application is a National Stage of, and claims priority to and the benefit of, International Patent Application No. PCT/US2021/016296, filed Feb. 3, 2021, which, in turn, claims the benefit of and priority to, U.S. Provisional Application No. 62/969,697, filed Feb. 4, 2020; U.S. Provisional Application No. 62/986,848, filed Mar. 9, 2020; and U.S. Provisional Application No. 62/986,852, filed Mar. 9, 2020, the entire disclosures of each of which are incorporated by reference herein.

FIELD OF THE DISCLOSURE

The present disclosure encompasses a novel solid state form of Blarcamesine and salts thereof, processes for preparation thereof, and pharmaceutical compositions thereof.

BACKGROUND OF THE DISCLOSURE

Blarcamesine HCl salt, Tetrahydro-N,N-dimethyl-2,2-diphenyl-3-furanmethanamine hydrochloride, referred to herein as compound 1, has the following chemical structure:

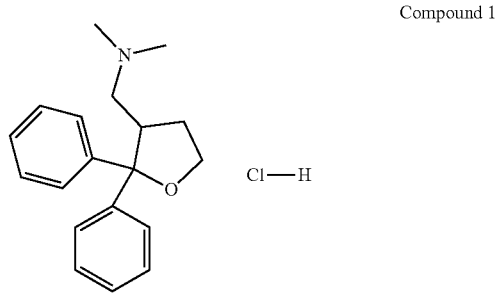 [SMILES: CN(C)CC1CCOC1(c1ccccc1)c1ccccc1 ; Cl]

Compound 1

Blarcamesine HCl salt is under investigation for the treatment of Neurodegenerative and Neurodevelopmental Diseases such as Alzheimer's disease, Parkinson's disease dementia and/or Rett syndrome.

The compound is described in International Publication No. WO 1997/30983. Forms of Blarcamesine HCl salt and other salts thereof are described in International Publication No. WO 2017/013498 and International Publication No. WO 2019/200345. Pharmaceutical compositions are described in International Publication No. WO 2017/013496, U.S. Pat. No. 10,426,754 and International Publication No. WO 2018/231216.

Polymorphism, the occurrence of different crystalline forms, is a property of some molecules and molecular complexes. A single molecule may give rise to a variety of polymorphs having distinct crystal structures and physical properties like melting point, thermal behaviors (e.g., measured by thermogravimetric analysis—"TGA", or differential scanning calorimetry—"DSC"), X-ray diffraction (XRD) pattern, infrared absorption fingerprint, and solid state ($^{13}$C) NMR spectrum. One or more of these techniques may be used to distinguish different polymorphic forms of a compound.

Different salts and solid state forms (including solvated forms) of an active pharmaceutical ingredient may possess different properties. Such variations in the properties of different salts and solid state forms and solvates may provide a basis for improving formulation, for example, by facilitating better processing or handling characteristics, changing the dissolution profile in a favorable direction, or improving stability (polymorph as well as chemical stability) and shelf-life. These variations in the properties of different salts and solid state forms may also offer improvements to the final dosage form, for instance, if they serve to improve bioavailability. Different salts and solid state forms and solvates of an active pharmaceutical ingredient may also give rise to a variety of polymorphs or crystalline forms, which may in turn provide additional opportunities to assess variations in the properties and characteristics of a solid active pharmaceutical ingredient.

Discovering new solid state forms and solvates of a pharmaceutical product may yield materials having desirable processing properties, such as ease of handling, ease of processing, storage stability, and ease of purification or as desirable intermediate crystal forms that facilitate conversion to other polymorphic forms. New solid state forms of a pharmaceutically useful compound can also provide an opportunity to improve the performance characteristics of a pharmaceutical product. It enlarges the repertoire of materials that a formulation scientist has available for formulation optimization, for example by providing a product with different properties, e.g., a different crystal habit, higher crystallinity, or polymorphic stability, which may offer better processing or handling characteristics, improved dissolution profile, or improved shelf-life (chemical/physical stability). For at least these reasons, there is a need for additional solid state forms (including solvated forms) of Blarcamesine HCl and other salts of Blarcamesine.

SUMMARY OF THE DISCLOSURE

The present disclosure provides crystalline polymorphs of Blarcamesine salts including Blarcamesine HCl, Blarcamesine HBr, Blarcamesine Tosylate, Blarcamesine Maleate, Blarcamesine Camphorsufonate and Blarcamesine Besylate, processes for preparation thereof, and pharmaceutical compositions thereof. The crystalline polymorphs can be used to prepare other solid state forms of Blarcamesine or its salts and solid state forms thereof, particularly Blarcamesine HCl and solid state forms thereof.

The present disclosure also provides uses of the said solid state forms of any one of HCl, HBr, Tosylate, Maleate, Camphorsulfonate and Besylate salts of Blarcamesine in the preparation of other solid state forms of Blarcamesine or it's salts and solid state forms thereof, particularly Blarcamesine HCl and solid state forms thereof.

The present disclosure provides crystalline polymorphs of any one of HCl, HBr, Tosylate, Maleate, Camphorsulfonate and Besylate salts of Blarcamesine for use in medicine, preferably for the treatment of Neurodegenerative and Neurodevelopmental Diseases such as Alzheimer's disease, Parkinson's disease dementia and/or Rett syndrome.

The present disclosure also encompasses the use of crystalline polymorphs of any one of HCl, HBr, Tosylate, Maleate, Camphorsulfonate and Besylate salts of Blarcamesine of the present disclosure for the preparation of pharmaceutical compositions and/or formulations.

In another aspect, the present disclosure provides pharmaceutical compositions comprising crystalline polymorphs of any one of HCl, HBr, Tosylate, Maleate, Camphorsulfonate and Besylate salts of Blarcamesine according to the present disclosure.

The present disclosure comprises processes for preparing the above mentioned pharmaceutical compositions. The processes comprise combining any one or a combination of the crystalline polymorphs of any one of HCl, HBr, Tosylate, Maleate, Camphorsulfonate and Besylate salts of Blarcamesine with at least one pharmaceutically acceptable excipient.

The crystalline polymorph of any one of HCl, HBr, Tosylate, Maleate, Camphorsulfonate and Besylate salts of Blarcamesine as defined herein and the pharmaceutical compositions or formulations of the any one of the crystalline polymorphs of any one of HCl, HBr, Tosylate, Maleate, Camphorsulfonate and Besylate salts of Blarcamesine may be used as medicaments, particularly for the treatment of Neurodegenerative and Neurodevelopmental Diseases such as Alzheimer's disease, Parkinson's disease dementia and/or Rett syndrome.

The present disclosure also provides methods of treating Neurodegenerative and Neurodevelopmental Diseases such as Alzheimer's disease, Parkinson's disease dementia and/or Rett syndrome, comprising administering a therapeutically effective amount of any one or a combination of any one of the crystalline polymorphs of any one of HCl, HBr, Tosylate, Maleate, Camphorsulfonate and Besylate salts of Blarcamesine of the present disclosure, or at least one of the above pharmaceutical compositions or formulations, to a subject suffering from a Neurodegenerative and Neurodevelopmental Diseases such as Alzheimer's disease, Parkinson's disease dementia and/or Rett syndrome, or otherwise in need of the treatment.

The present disclosure also provides the uses of any one of the crystalline polymorphs of any one of HCl, HBr, Tosylate, Maleate, Camphorsulfonate and Besylate salts of Blarcamesine of the present disclosure, or at least one of the above pharmaceutical compositions or formulations, for the manufacture of medicaments for treating e.g.: Neurodegenerative and Neurodevelopmental Diseases such as Alzheimer's disease, Parkinson's disease dementia and/or Rett syndrome.

BRIEF DESCRIPTION OF THE DRAWINGS

FIG. 1 shows an X-ray powder diffraction pattern (XRPD) of Form A of Blarcamesine HBr;

FIG. 2 shows a characteristic FTIR spectrum of Form A of Blarcamesine HBr;

FIG. 3 shows a characteristic solid state $^{13}$C NMR spectrum of Form A of Blarcamesine HBr (full range 200-0 ppm);

FIG. 4 shows a characteristic solid state $^{13}$C NMR spectrum of Form A of Blarcamesine HBr (100-0 ppm);

FIG. 5 shows a characteristic solid state $^{13}$C NMR spectrum of Form A of Blarcamesine HBr (200-100 ppm);

FIG. 6 shows a scanning electron microscopy (SEM) image of Particles of Form A of Blarcamesine HBr (X750 magnification and X1500 magnification);

FIG. 7 shows an X-ray powder diffraction pattern (XRPD) of Form B of Blarcamesine HBr;

FIG. 8 shows a characteristic FTIR spectrum of Form B of Blarcamesine HBr;

FIG. 9 shows a characteristic solid state $^{13}$C NMR spectrum of Form B of Blarcamesine HBr (full range 200-0 ppm);

FIG. 10 shows a characteristic solid state $^{13}$C NMR spectrum of Form B of Blarcamesine HBr (100-0 ppm);

FIG. 11 shows a characteristic solid state $^{13}$C NMR spectrum of Form B of Blarcamesine HBr (200-100 ppm);

FIG. 12 shows a scanning electron microscopy (SEM) image of Particles of Form B of Blarcamesine HBr (X750 magnification and X1500 magnification);

FIG. 13 shows an X-ray powder diffraction pattern (XRPD) of Form B3 of Blarcamesine HCl salt;

FIG. 14 shows X-ray powder diffraction pattern (XRPD) of Form S1 of Blarcamesine Besylate;

FIG. 15 shows X-ray powder diffraction pattern (XRPD) of Form S2 of Blarcamesine Besylate;

FIG. 16 shows X-ray powder diffraction pattern (XRPD) of Form S3 of Blarcamesine Tosylate;

FIG. 17 shows X-ray powder diffraction pattern (XRPD) of Form S4 of Blarcamesine Tosylate;

FIG. 18 shows X-ray powder diffraction pattern (XRPD) of Form S5 of Blarcamesine Hydrogen Maleate;

FIG. 19 shows a characteristic FTIR spectrum of Form S5 of Blarcamesine Hydrogen Maleate;

FIG. 20 shows a characteristic solid state $^{13}$C NMR spectrum of Form S5 of Blarcamesine Hydrogen Maleate (full range 200-0 ppm);

FIG. 21 shows a characteristic solid state $^{13}$C NMR spectrum of Form S5 of Blarcamesine Hydrogen Maleate (200-100 ppm);

FIG. 22 shows a characteristic solid state $^{13}$C NMR spectrum of Form S5 of Blarcamesine Hydrogen Maleate (100-0 ppm);

FIG. 23 shows X-ray powder diffraction pattern (XRPD) of Form S6 of Blarcamesine Hydrogen Maleate;

FIG. 24 shows a characteristic FTIR spectrum of Form S6 of Blarcamesine Hydrogen Maleate;

FIG. 25 shows a characteristic solid state $^{13}$C NMR spectrum of Form S6 of Blarcamesine Hydrogen Maleate (full range 200-0 ppm);

FIG. 26 shows a characteristic solid state $^{13}$C NMR spectrum of Form S6 of Blarcamesine Hydrogen Maleate (200-100 ppm);

FIG. 27 shows a characteristic solid state $^{13}$C NMR spectrum of Form S6 of Blarcamesine Hydrogen Maleate (100-0 ppm); and FIG. 28 shows X-ray powder diffraction pattern (XRPD) of Form S7 of Blarcamesine Camphorsulfonate.

DETAILED DESCRIPTION OF THE DISCLOSURE

The present disclosure encompasses solid state forms of Blarcamesine salts Particularly Blarcamesine HCl, Blarcamesine HBr, Blarcamesine Tosylate, Blarcamesine Maleate, Blarcamesine Camphorsufonate and Blarcamesine Besylate, processes for preparation thereof, and pharmaceutical compositions thereof.

Solid state properties of Blarcamesine salts Particularly Blarcamesine HCl, Blarcamesine HBr, Blarcamesine Tosylate, Blarcamesine Maleate, Blarcamesine Camphorsufonate and Blarcamesine Besylate and crystalline polymorphs thereof can be influenced by controlling the conditions under which Blarcamesine salts Particularly Blarcamesine HCl, Blarcamesine HBr, Blarcamesine Tosylate, Blarcamesine Maleate, Blarcamesine Camphorsufonate and Blarcamesine Besylate and the crystalline polymorphs thereof are obtained in solid form.

A solid state form (or polymorph) may be referred to herein as polymorphically pure or as substantially free of any other solid state (or polymorphic) forms. As used herein in this context, the expression "substantially free of any other forms" will be understood to mean that the solid state form contains about 20% (w/w) or less, about 10% (w/w) or less, about 5% (w/w) or less, about 2% (w/w) or less, about 1% (w/w) or less, or about 0% of any other forms of the subject compound as measured, for example, by XRPD. Thus, a crystalline polymorph of, for example, Blarcamesine HBr salt described herein as substantially free of any other solid state forms would be understood to contain greater than about 80% (w/w), greater than about 90% (w/w), greater than about 95% (w/w), greater than about 98% (w/w), greater than about 99% (w/w), or about 100% of the subject crystalline polymorph of Blarcamesine HBr salt. In some embodiments of the disclosure, the described crystalline polymorph of any one of the crystalline forms of Blarcamesine salts, particularly Blarcamesine HCl, Blarcamesine HBr, Blarcamesine Tosylate, Blarcamesine Maleate, Blarcamesine Camphorsufonate and Blarcamesine Besylate may contain from about 1% to about 20% (w/w), from about 5% to about 20% (w/w), or from about 5% to about 10% (w/w) of one or more other crystalline polymorph of the same Blarcamesine salt.

Depending on which other crystalline polymorphs a comparison is made, the crystalline polymorphs of Blarcamesine salts of the present disclosure may have advantageous properties selected from at least one of the following: chemical purity, flowability, solubility, dissolution rate, morphology or crystal habit, stability-such as chemical stability as well as thermal and mechanical stability with respect to polymorphic conversion, stability towards dehydration and/or storage stability, low content of residual solvent, a lower degree of hygroscopicity, flowability, and advantageous processing and handling characteristics such as compressibility, and bulk density.

A solid state form, such as a crystal form or an amorphous form, may be referred to herein as being characterized by graphical data "as depicted in" or "as substantially depicted in" a Figure. Such data include, for example, powder X-ray diffractograms and solid state NMR spectra. As is well-known in the art, the graphical data potentially provides additional technical information to further define the respective solid state form (a so-called "fingerprint") which cannot necessarily be described by reference to numerical values or peak positions alone. In any event, the skilled person will understand that such graphical representations of data may be subject to small variations, e.g., in peak relative intensities and peak positions due to certain factors such as, but not limited to, variations in instrument response and variations in sample concentration and purity, which are well known to the skilled person. Nonetheless, the skilled person would readily be capable of comparing the graphical data in the Figures herein with graphical data generated for an unknown crystal form and confirm whether the two sets of graphical data are characterizing the same crystal form or two different crystal forms. For example, a crystal form of Blarcamesine HBr salt referred to herein as being characterized by graphical data "as depicted in" or "as substantially depicted in" a Figure will thus be understood to include any crystal forms of Blarcamesine HBr salt characterized with the graphical data having such small variations, as are well known to the skilled person, in comparison with the Figure.

As used herein, and unless stated otherwise, the term "anhydrous" in relation to crystalline forms of Blarcamesine salts, relates to a crystalline form of Blarcamesine salt which does not include any crystalline water (or other solvents) in a defined, stoichiometric amount within the crystal. Moreover, an "anhydrous" form would typically not contain more than 1% (w/w), of either water or organic solvents as measured for example by TGA.

The term "solvate," as used herein and unless indicated otherwise, refers to a crystal form that incorporates a solvent in the crystal structure. When the solvent is water, the solvate is often referred to as a "hydrate." The solvent in a solvate may be present in either a stoichiometric or in a non-stoichiometric amount.

As used herein, the term "isolated" in reference to crystalline polymorph of Blarcamesine salt of the present disclosure corresponds to a crystalline polymorph of Blarcamesine salt that is physically separated from the reaction mixture in which it is formed.

As used herein, unless stated otherwise, the XRPD measurements are taken using copper Kα radiation wavelength 1.54187 Å. XRPD peaks reported herein are measured using Cuk α radiation, λ=1.54187 Å, typically at a temperature of 25±3° C. Alternatively, if an instrument with a different wavelength is used, for example, when using high resolution XRD method, such as synchrotron, the data may be corrected to wavelength of 1.541874 respectively.

As used herein, $^{13}$C NMR spectra are preferably measured at 125 MHz at magic angle spinning (MAS) frequency ωr/2π=13 kHz As used herein, unless stated otherwise, TGA analysis is carried out at a heating rate of 10° C./min to 250° C., preferably with a nitrogen flow of 40 ml/min.

A thing, e.g., a reaction mixture, may be characterized herein as being at, or allowed to come to "room temperature" or "ambient temperature", often abbreviated as "RT." This means that the temperature of the thing is close to, or the same as, that of the space, e.g., the room or fume hood, in which the thing is located. Typically, room temperature is from about 20° C. to about 30° C., or about 22° C. to about 27° C., or about 25° C.

The amount of solvent employed in a chemical process, e.g., a reaction or crystallization, may be referred to herein as a number of "volumes" or "vol" or "V." For example, a material may be referred to as being suspended in 10 volumes (or 10 vol or 10V) of a solvent. In this context, this expression would be understood to mean milliliters of the solvent per gram of the material being suspended, such that suspending a 5 grams of a material in 10 volumes of a solvent means that the solvent is used in an amount of 10 milliliters of the solvent per gram of the material that is being suspended or, in this example, 50 mL of the solvent. In another context, the term "v/v" may be used to indicate the number of volumes of a solvent that are added to a liquid mixture based on the volume of that mixture. For example, adding solvent X (1.5 v/v) to a 100 ml reaction mixture would indicate that 150 mL of solvent X was added.

A process or step may be referred to herein as being carried out "overnight." This refers to a time interval, e.g., for the process or step, that spans the time during the night, when that process or step may not be actively observed. This time interval is from about 8 to about 20 hours, or about 10-18 hours, typically about 16 hours.

As used herein, the term "reduced pressure" refers to a pressure that is less than atmospheric pressure. For example, reduced pressure is about 10 mbar to about 50 mbar.

As used herein and unless indicated otherwise, the term "ambient conditions" refer to atmospheric pressure and a temperature of 22-24° C.

The present disclosure includes a crystalline polymorph of Blarcamesine HBr, designated Form A. The crystalline Form A of Blarcamesine HBr may be characterized by data selected from one or more of the following: an X-ray powder diffraction pattern substantially as depicted in FIG. 1; an X-ray powder diffraction pattern having peaks at 6.4, 13.9, 19.2, 20.3 and 21.5 degrees 2-theta±0.2 degrees 2-theta; a solid state $^{13}$C NMR spectrum with characteristic peaks at 143.7, 127.1, 59.0, 50.7 and 43.5 ppm±0.2 ppm; a solid state $^{13}$C NMR spectrum having the following chemical shift absolute differences from reference peak at 146.7 ppm #1 ppm: 3.0, 19.6, 87.7, 96.0 and 103.2 ppm±0.1 ppm; a solid state $^{13}$C NMR spectrum substantially as depicted in any of FIGS. 3, 4 and 5; and combinations of these data.

Crystalline Form A of Blarcamesine HBr may be further characterized by an X-ray powder diffraction pattern having peaks at 6.4, 13.9, 19.2, 20.3 and 21.5 degrees 2-theta±0.2 degrees 2-theta, and also having any one, two, three, four or five additional peaks selected from 11.6, 13.1, 16.1, 22.3 and 23.2 degrees 2-theta±0.2 degrees 2-theta.

Crystalline form A of Blarcamesine HBr may be alternatively characterized by X-ray powder diffraction pattern having peaks at 6.4, 11.6, 13.1, 13.9, 16.1, 19.2, 20.3, 21.5, 22.3 and 23.2 degrees 2-theta±0.2 degrees 2-theta or by an X-ray powder diffraction pattern having peaks at 6.4, 11.6, 12.6, 13.1, 13.9, 16.1, 19.2, 20.3, 21.5, 22.3, 23.2, 25.4, 26.0, 27.5 and 29.0 degrees 2-theta±0.2 degrees 2-theta.

The above crystalline Form A of Blarcamesine HBr may be an anhydrous form, as can be determined by TGA. In certain embodiments, the present disclosure comprises crystalline Form A of Blarcamesine HBr having up to 0.5% w/w residual solvent content.

In one embodiment of the present disclosure, crystalline Form A of Blarcamesine HBr is isolated.

Crystalline Form A of Blarcamesine HBr may be characterized by each of the above characteristics alone/or by all possible combinations, e.g., an XRPD pattern having peaks at 6.4, 13.9, 19.2, 20.3 and 21.5 degrees 2-theta±0.2 degrees 2-theta; an XRPD pattern as depicted in FIG. 1; by the above described $^{13}$C NMR data; and combinations thereof.

Crystalline form A of Blarcamesine HBr may be prepared by crystallisation from a mixture comprising Blarcamesine HBr and a solvent comprising ethyl acetate or isopropanol, or mixtures thereof. Optionally, the mixture may further comprise water. The water may be present in an amount of: about 0.2 to about 2 ml per gram of Blarcamesine, about 0.3 to about 1.5 ml per gram of Blarcamesine, about 0.4 to about 0.7 ml per gram of Blarcamesine, or about 0.6 ml per gram of Blarcamesine. In any embodiment, the process comprises:
 (a) providing a mixture of Blarcamesine HBr in a solvent comprising ethyl acetate or isopropanol or a mixture thereof;
 (b) optionally stirring the mixture; and
 (c) optionally isolating crystalline form A of Blarcamesine HBr from the mixture.

In any of the embodiments of the process, the mixture in step (a) may be prepared by:
 (i) providing a mixture of Blarcamesine free base in a solvent comprising ethyl acetate or isopropanol or mixture thereof;
 (ii) combining the mixture with hydrogen bromide or hydrobromic acid; or by (ia) combining Blarcamesine HBr with a solvent comprising ethyl acetate or isopropanol or mixtures thereof.

In step (i), the ratio of solvent to Blarcamesine may be present in an amount of: about 5 to about 20 ml per gram of Blarcamesine, about 6 to about 15 ml per gram of Blarcamesine, or about 8 to about 12 ml per gram of Blarcamesine, or about 9 to about 11 ml per gram of Blarcamesine, and optionally about 10 ml per gram of Blarcamesine. The mixture may be a solution or a slurry.

In step (ii), the mixture of Blarcamesine in the solvent may be combined with hydrogen bromide, or a solution of hydrogen bromide gas in an appropriate solvent. The hydrogen bromide may be in aqueous solution (i.e. hydrobromic acid). In any embodiment, step (ii) may be conducted at a temperature of: about 2° C. to about 25° C., about 3° C. to about 10° C., about 3° C. to about 8° C., about 3° C. to about 6° C., about 3.5 to about 5° C., or about 4° C. The combining may be in any order. Preferably, the hydrogen bromide, hydrogen bromide solution or hydrobromic acid may be added to the mixture of Blarcamesine in the solvent. The addition may be carried out portionwise or dropwise. The hydrogen bromide or hydrobromic acid is optionally added in an amount of: about 1.2 to about 2.5 molar equivalents, about 1.3 to about 2.2 molar equivalents, about 1.5 to about 2 molar equivalents, or about 1.8 molar equivalents relative to Blarcamesine. Preferably, step (ii) comprises adding hydrobromic acid, i.e. an aqueous solution of hydrogen bromide, to the mixture of Blarcamesine and solvent. In any embodiment, the hydrogen bromide may be in an aqueous solution comprising: about 20 to about 49 wt % HBr, or about 30 to about 49 wt % HBr, or about 45 to about 48 wt % HBr, and preferably about 48% HBr.

In any embodiment of the process, step (b) is carried out, preferably by stirring at a temperature of: about 2° C. to about 25° C., about 3° C. to about 10° C., about 3° C. to about 8° C., about 3° C. to about 6° C., about 3.5 to about 5° C., or about 4° C. The stirring may be carried out for any suitable time, preferably for about 4 to about 48 hours, about 8 to about 24 hours, about 15 to about 20 hours, or about 18 hours.

In any embodiment of the process, step (c) may comprise isolating crystalline form A from the mixture. The isolation can be carried out by any suitable method, for example by filtration, centrifuge, or decantation. Preferably the isolation is carried out by filtration. The crystals of form A of Blarcamesine HBr may be washed with the reaction solvent, and optionally dried. The drying may be conducted in a vacuum oven at a temperature of about 20° C. to about 70° C., about 30° C. to about 60° C., about 35° C. to about 55° C., about 40 to about 50° C., or about 45° C. The drying may be carried out over a period of about 4 to about 48 hours, about 8 to about 24 hours, about 15 to about 20 hours, or about 18 hours.

The present disclosure includes a crystalline polymorph of Blarcamesine HBr, designated form B. The crystalline Form B of Blarcamesine HBr may be characterized by data selected from one or more of the following: an X-ray powder diffraction pattern substantially as depicted in FIG. 7; an X-ray powder diffraction pattern having peaks at 7.9, 10.2, 11.9, 15.9 and 21.1 degrees 2-theta±0.2 degrees 2-theta; a solid state $^{13}$C NMR spectrum with characteristic peaks at 144.8, 134.8, 47.0, 46.5 and 42.7 ppm±0.2 ppm; a solid state $^{13}$C NMR spectrum having the following chemical shift absolute differences from reference peak at 148.9 ppm #1 ppm: 4.1, 14.1, 101.9, 102.4 and 106.2 ppm±0.1 ppm; a solid state $^{13}$C NMR spectrum substantially as depicted in any of FIGS. 9, 10 and 11; and combinations of these data.

Crystalline Form B of Blarcamesine HBr may be further characterized by an X-ray powder diffraction pattern having peaks at 7.9, 10.2, 11.9, 15.9 and 21.1 degrees 2-theta±0.2 degrees 2-theta, and also having any one, two, three, four or five additional peaks selected from 13.1, 16.9, 17.9, 20.4 and 23.8 degrees 2-theta±0.2 degrees 2-theta.

Crystalline form B of Blarcamesine HBr may be alternatively characterized by X-ray powder diffraction pattern having peaks at 7.9, 10.2, 11.9, 13.1, 15.9, 16.9, 17.9, 20.4, 21.1 and 23.8 degrees 2-theta±0.2 degrees 2-theta or by an X-ray powder diffraction pattern having peaks at 7.9, 10.2, 11.9, 13.1, 15.9, 16.4, 16.9, 17.9, 19.6, 20.0, 20.4, 21.1, 23.8, 24.3, 25.2, 25.5 and 26.3 degrees 2-theta±0.2 degrees 2-theta.

The above crystalline Form B of Blarcamesine HBr may be an anhydrous form, as can be determined by TGA. In certain embodiments, the present disclosure comprises crystalline Form B of Blarcamesine HBr having up to 0.5% w/w residual solvent content.

In one embodiment of the present disclosure, crystalline Form B of Blarcamesine HBr is isolated.

Crystalline Form B of Blarcamesine HBr may be characterized by each of the above characteristics alone/or by all possible combinations, e.g., an XRPD pattern having peaks at 7.9, 10.2, 11.9, 15.9 and 21.1 degrees 2-theta±0.2 degrees 2-theta; an XRPD pattern as depicted in FIG. 7; by the above described $^{13}$C NMR data; and combinations thereof.

Crystalline form B of Blarcamesine HBr may be prepared by crystallisation from a mixture of Blarcamesine HBr and a solvent comprising methanol or water, or mixtures thereof.

In any embodiment, the process comprises:
(a) providing a mixture of Blarcamesine HBr in a solvent comprising methanol or water or mixture thereof;
(b) optionally stirring the mixture; and
(c) optionally isolating crystalline form B of Blarcamesine HBr from the mixture.

In any of the embodiments of the process, the mixture in step (a) may be prepared by:
(i) providing a mixture of Blarcamesine free base in a solvent comprising methanol or water, or mixture thereof;
(ii) combining the mixture with hydrogen bromide or hydrobromic acid; or by
(ia) combining Blarcamesine HBr with a solvent comprising methanol or water or mixtures thereof.

In step (i), the ratio of solvent to Blarcamesine may be present in an amount of: about 5 to about 50 ml per gram of Blarcamesine, about 5 to about 40 ml per gram of Blarcamesine, or about 8 to about 35 ml per gram of Blarcamesine. In any embodiment of this process, the mixture is a solution. In any embodiment of this process when methanol is used as the solvent, the amount of methanol may be: about 4 to about 20 ml per gram of Blarcamesine, about 6 to about 15 ml per gram of Blarcamesine, about 6 to about 14 ml per gram of Blarcamesine, about 7 to about 12 ml per gram of Blarcamesine, about 8 to about 11 ml per gram of Blarcamesine and optionally about 10 ml per gram of Blarcamesine. In any embodiment of this process when water is used as the solvent, the amount of water may be: about 10 to about 50 ml per gram of Blarcamesine, about 15 to about 40 ml per gram of Blarcamesine, about 20 to about 35 ml per gram of Blarcamesine, or about 25 to about 30 ml per gram of Blarcamesine, or about 30 ml per gram of Blarcamesine. The mixture may be a solution or a slurry, optionally a slurry. Preferably, the mixture of Blarcamesine in the solvent is at a temperature of: about 2° C. to about 40° C., about 3 to about 35° C., about 3° C. to about 25° C. Preferably, when water is used, the mixture is at a temperature of: about 18 to about 40° C., about 20 to about 35° C., about 20 to about 30° C., about 22 to about 25° C. or at room temperature. Preferably, when methanol is used, the mixture is at a temperature of: about 2° C. to about 15° C., about 3° C. to about 10° C., about 3 to about 6° C., or about 4° C.

In step (ii) of this process, the mixture comprising Blarcamesine and the solvent may be combined with hydrogen bromide, or a solution of hydrogen bromide gas in an appropriate solvent. The solvent for the hydrogen bromide gas may be methanol or water. Alternatively the hydrogen bromide may be in aqueous solution (i.e. hydrobromic acid). In any embodiment, step (ii) may be conducted at a temperature of about 2° C. to about 40° C., about 3 to about 35° C., about 3° C. to about 25° C. Preferably, when water is used, step (ii) is conducted at a temperature of: about 18 to about 40° C., about 20 to about 35° C., about 20 to about 30° C., about 22 to about 25° C. or at room temperature. Preferably, when methanol is used, the mixture is at a temperature of: about 2° C. to about 15° C., about 3° C. to about 10° C., about 3 to about 6° C., or about 4° C. The combining may be in any order. Preferably, the hydrogen bromide, hydrogen bromide solution or hydrobromic acid may be added to the mixture of Blarcamesine in the solvent. The hydrogen bromide or hydrobromic acid is optionally added in an amount of: about 1 to about 1.5 molar equivalents, about 1.2 to about 2.5 molar equivalents, about 1.3 to about 2.2 molar equivalents, about 1.5 to about 2 molar equivalents, or about 1.8 molar equivalents. Preferably, step (ii) comprises adding hydrobromic acid, i.e. an aqueous solution of hydrogen bromide, to the mixture of Blarcamesine and solvent. The addition may be carried out portionwise or dropwise. In any embodiment, the hydrogen bromide may be in an aqueous solution comprising: about 20 to about 49 wt % HBr, or about 30 to about 49 wt % HBr, or about 45 to about 48 wt % HBr, and preferably about 48% HBr.

In step (ia), in any embodiment when methanol is used as the solvent, the amount of methanol may be: about 4 to about 20 ml per gram of Blarcamesine HBr, about 6 to about 15 ml per gram of Blarcamesine HBr, about 6 to about 12 ml per gram of Blarcamesine HBr, or about 7 to about 10 ml per gram of Blarcamesine HBr, about 7 to about 9 ml per gram of Blarcamesine HBr and optionally about 8 ml per gram of Blarcamesine HBr. In any embodiment when water is used as the solvent, the amount of water may be: about 20 to about 60 ml per gram of Blarcamesine HBr, about 30 to about 50 ml per gram of Blarcamesine HBr, about 35 to about 45 ml per gram of Blarcamesine HBr, or about 40 ml per gram of Blarcamesine HBr.

Preferably, a solution of the Blarcamesine HBr in the solvent is prepared at: about 18 to about 40° C., about 20 to about 35° C., about 20 to about 30° C., about 22 to about 25° C. or at room temperature. In any embodiment, the crystallisation may be carried out by solvent removal. In embodiments, the solvent removal can be carried out by slow evaporation of the solvent. The slow evaporation may be carried out by exposure to room temperature over a suitable period of time to obtain crystalline form B of Blarcamesine HBr. Typically, the slow evaporation is over a period of: about 2 to about 20 days, about 2 to about 15 days, about 3 to about 13 days, or about 3 to about 12 days.

In any embodiment of the process, step (b) is carried out, preferably by stirring at a temperature of: 2° C. to about 40° C., about 3 to about 35° C., about 3° C. to about 25° C. Preferably, when water is used, step (ii) is conducted at a temperature of: about 18 to about 40° C., about 20 to about 35° C., about 20 to about 30° C., about 22 to about 25° C. or at room temperature. Preferably, when methanol is used, the mixture is at a temperature of: about 2° C. to about 15° C., about 3° C. to about 10° C., about 3 to about 6° C., or about 4° C. The stirring may be carried out for any suitable time, preferably for about 4 to about 48 hours, about 8 to about 24 hours, about 15 to about 20 hours, or about 18 hours.

In any embodiment of the process, step (iv) may comprise isolating crystalline form B Blarcamesine HBr from the mixture. The isolation can be carried out by any suitable method, for example by filtration, centrifuge, or decantation. Preferably the isolation is carried out by filtration. The crystals of form B of Blarcamesine HBr may be washed with the reaction solvent, and optionally dried. The drying may be conducted in a vacuum oven at a temperature of about 20° C. to about 70° C., about 30° C. to about 60° C., about 35° C. to about 55° C., about 40 to about 50° C., or about 45° C. The drying may be carried out over a period of about 4 hours to about 120 hours, about 10 to about 100 hours, about 30 to about 80 hours, or about 72 hours.

The present disclosure includes a crystalline polymorph of Blarcamesine HCl salt, designated B3. The crystalline Form B3 of Blarcamesine HCl salt may be characterized by data selected from one or more of the following: an X-ray powder diffraction pattern substantially as depicted in FIG. 13; an X-ray powder diffraction pattern having peaks at 11.0, 17.7, 19.1, 19.5 and 20.8 degrees 2-theta±0.2 degrees 2-theta; and combinations of these data.

Crystalline Form B3 of Blarcamesine HCl salt may be further characterized by an X-ray powder diffraction pattern having peaks at 11.0, 17.7, 19.1, 19.5 and 20.8 degrees 2-theta±0.2 degrees 2-theta, and also having any one, two, three, four or five additional peaks selected from 7.5, 11.7, 16.8, 20.1 and 22.0 degrees 2-theta±0.2 degrees 2-theta.

In one embodiment of the present disclosure, crystalline Form B3 of Blarcamesine HCl salt is isolated.

In one embodiment, crystalline form B3 of Blarcamesine HCl salt is polymorphically pure.

In embodiments crystalline form B3 of Blarcamesine HCl may be an amyl alcohol solvate.

Crystalline Form B3 of Blarcamesine HCl salt may be characterized by each of the above characteristics alone or by all possible combinations, e.g., an XRPD pattern having peaks at 11.0, 17.7, 19.1, 19.5 and 20.8 degrees 2-theta±0.2 degrees 2-theta; an XRPD pattern as depicted in FIG. 13, and combinations thereof.

The present disclosure includes a crystalline polymorph of Blarcamesine Besylate, designated form S1. The crystalline Form S1 of Blarcamesine Besylate may be characterized by data selected from one or more of the following: an X-ray powder diffraction pattern substantially as depicted in FIG. 14; an X-ray powder diffraction pattern having peaks at 11.2, 12.1, 14.1, 18.0 and 23.9 degrees 2-theta±0.2 degrees 2-theta; and combinations of these data.

Crystalline Form S1 of Blarcamesine Besylate may be further characterized by an X-ray powder diffraction pattern having peaks at 11.2, 12.1, 14.1, 18.0 and 23.9 degrees 2-theta±0.2 degrees 2-theta, and also having any one, two, three, four or five additional peaks selected from 10.4, 16.0, 17.0, 18.6 and 19.1 degrees 2-theta±0.2 degrees 2-theta.

In one embodiment of the present disclosure, crystalline Form S1 of Blarcamesine Besylate is isolated.

Crystalline Form S1 of Blarcamesine Besylate may be characterized by each of the above characteristics alone/or by all possible combinations, e.g., an XRPD pattern having peaks at 11.2, 12.1, 14.1, 18.0 and 23.9 degrees 2-theta±0.2 degrees 2-theta; an XRPD pattern as depicted in FIG. 14, and combinations thereof.

The present disclosure includes a crystalline polymorph of Blarcamesine Besylate, designated form S2. The crystalline Form S2 of Blarcamesine Besylate may be characterized by data selected from one or more of the following: an X-ray powder diffraction pattern substantially as depicted in FIG. 15; an X-ray powder diffraction pattern having peaks at 6.4, 13.7, 14.5, 16.7 and 19.5 degrees 2-theta±0.2 degrees 2-theta; and combinations of these data.

Crystalline Form S2 of Blarcamesine Besylate may be further characterized by an X-ray powder diffraction pattern having peaks at 6.4, 13.7, 14.5, 16.7 and 19.5 degrees 2-theta±0.2 degrees 2-theta, and also having any one, two, three, four or five additional peaks selected from 11.1, 12.4, 15.5, 17.1 and 22.8 degrees 2-theta±0.2 degrees 2-theta.

In one embodiment of the present disclosure, crystalline Form S2 of Blarcamesine Besylate is isolated.

Crystalline Form S2 of Blarcamesine Besylate may be characterized by each of the above characteristics alone/or by all possible combinations, e.g., an XRPD pattern having peaks at 6.4, 13.7, 14.5, 16.7 and 19.5 degrees 2-theta±0.2 degrees 2-theta; an XRPD pattern as depicted in FIG. 15, and combinations thereof.

The present disclosure includes a crystalline polymorph of Blarcamesine Tosylate designated form S3. The crystalline Form S3 of Blarcamesine Tosylate may be characterized by data selected from one or more of the following: an X-ray powder diffraction pattern substantially as depicted in FIG. 16; an X-ray powder diffraction pattern having peaks at 6.3, 10.4, 12.6, 15.3 and 20.4 degrees 2-theta±0.2 degrees 2-theta; and combinations of these data.

Crystalline Form S3 of Blarcamesine Tosylate may be further characterized by an X-ray powder diffraction pattern having peaks at 6.3, 10.4, 12.6, 15.3 and 20.4 degrees 2-theta±0.2 degrees 2-theta, and also having any one, two, three, four or five additional peaks selected from 16.0, 18.6, 19.7, 23.1 and 25.4 degrees 2-theta±0.2 degrees 2-theta.

In one embodiment of the present disclosure, crystalline Form S3 of Blarcamesine Tosylate is isolated.

Crystalline Form S3 of Blarcamesine Tosylate may be characterized by each of the above characteristics alone/or by all possible combinations, e.g., an XRPD pattern having peaks at 6.3, 10.4, 12.6, 15.3 and 20.4 degrees 2-theta±0.2 degrees 2-theta; an XRPD pattern as depicted in FIG. 16, and combinations thereof.

The present disclosure includes a crystalline polymorph of Blarcamesine Tosylate designated form S4. The crystalline Form S4 of Blarcamesine Tosylate may be characterized by data selected from one or more of the following: an X-ray powder diffraction pattern substantially as depicted in FIG. 17; an X-ray powder diffraction pattern having peaks at 5.9, 10.9, 11.9, 18.2 and 18.9 degrees 2-theta±0.2 degrees 2-theta; and combinations of these data.

Crystalline Form S4 of Blarcamesine Tosylate may be further characterized by an X-ray powder diffraction pattern having peaks at 5.9, 10.9, 11.9, 18.2 and 18.9 degrees 2-theta±0.2 degrees 2-theta, and also having any one, two, three, four or five additional peaks selected from 13.3, 16.7, 19.3, 22.5 and 24.0 degrees 2-theta±0.2 degrees 2-theta.

In one embodiment of the present disclosure, crystalline Form S4 of Blarcamesine Tosylate is isolated.

Crystalline Form S4 of Blarcamesine Tosylate may be characterized by each of the above characteristics alone/or by all possible combinations, e.g., an XRPD pattern having peaks at 5.9, 10.9, 11.9, 18.2 and 18.9 degrees 2-theta±0.2 degrees 2-theta; an XRPD pattern as depicted in FIG. 17, and combinations thereof.

The present disclosure includes a crystalline polymorph of Blarcamesine Hydrogen Maleate designated form S5. The crystalline Form S5 of Blarcamesine Hydrogen Maleate may be characterized by data selected from one or more of the following: an X-ray powder diffraction pattern substantially as depicted in FIG. 18; an X-ray powder diffraction pattern having peaks at 9.5, 10.6, 13.5, 15.8 and 20.4 degrees 2-theta±0.2 degrees 2-theta; a solid state $^{13}$C NMR spectrum with characteristic peaks at 174.3, 170.0, 148.6, 138.4 and 57.6 ppm±0.2 ppm; a solid state $^{13}$C NMR spectrum having the following chemical shift absolute differences from reference peak at 45.7 ppm±1 ppm: 128.6, 124.2, 102.8, 92.7 and 11.9 ppm±0.1 ppm; a solid state $^{13}$C NMR spectrum substantially as depicted in FIGS. 20, 21 and 22; and combinations of these data.

Crystalline Form S5 of Blarcamesine Hydrogen Maleate may be further characterized by an X-ray powder diffraction pattern having peaks at 9.5, 10.6, 13.5, 15.8 and 20.4 degrees 2-theta±0.2 degrees 2-theta, and also having any one, two, three, four or five additional peaks selected from 6.7, 19.7, 21.4, 24.5 and 25.9 degrees 2-theta±0.2 degrees 2-theta.

Crystalline Form S5 of Blarcamesine Hydrogen Maleate may be alternatively characterized by X-ray powder diffraction pattern having peaks at 6.7, 9.5, 10.6, 13.5, 15.8, 19.7, 20.4, 21.4, 24.5 and 25.9 degrees 2-theta±0.2 degrees 2-theta or by an X-ray powder diffraction pattern having peaks at 6.7, 9.5, 10.6, 13.5, 15.8, 17.1, 17.3, 18.5, 19.2, 19.7, 20.4, 21.4, 21.8, 22.1, 23.3, 24.2, 24.5 and 25.9 degrees 2-theta±0.2 degrees 2-theta.

The above crystalline S5 of Blarcamesine Hydrogen Maleate may be an anhydrous form, as can be determined by TGA. In certain embodiments, the present disclosure comprises crystalline S5 of Blarcamesine Hydrogen Maleate having up to 0.5% w/w residual solvent content.

In one embodiment of the present disclosure, crystalline Form S5 of Blarcamesine Hydrogen Maleate is isolated.

Crystalline Form S5 of Blarcamesine Hydrogen Maleate may be characterized by each of the above characteristics alone/or by all possible combinations, e.g., an XRPD pattern having peaks at 9.5, 10.6, 13.5, 15.8 and 20.4 degrees 2-theta±0.2 degrees 2-theta; an XRPD pattern as depicted in FIG. 18, by the above described $^{13}$C NMR data; and combinations thereof.

Crystalline form S5 of Blarcamesine Hydrogen Maleate may be prepared by crystallisation from a mixture of Blarcamesine Hydrogen Maleate and a solvent comprising isopropanol or ethanol, or mixtures thereof. In any embodiment, the mixture is prepared by a process comprising:
  (a) providing a mixture of Blarcamesine Hydrogen Maleate in a solvent comprising isopropanol or ethanol;
  (b) optionally stirring the mixture; and
  (c) optionally isolating crystalline form S5 of Blarcamesine Hydrogen Maleate from the mixture.

In any of the embodiments of the process, the mixture in step (a) may be prepared by:
  (i) combining Blarcamesine free base and maleic acid in a solvent comprising isopropanol or ethanol or mixture thereof; and
  (ii) optionally stirring the mixture;

Step (i) may be carried out by combining maleic acid with a solution of Blarcamesine in the solvent, by combining a solution of maleic acid in the solvent with a solution of Blarcamesine in the solvent, or by combining Blarcamesine with a solution of maleic acid in the solvent. Preferably step (i) is carried out by combining Blarcamesine with a solution of maleic acid in the solvent. More preferably, Blarcamesine is added to a solution of maleic acid in the solvent. Preferably the solvent is isopropanol. In step (i), the solvent may be present in an amount of: about 5 to about 20 ml per gram of Blarcamesine, about 6 to about 15 ml per gram of Blarcamesine, or about 8 to about 12 ml per gram of Blarcamesine, or about 9 to about 11 ml per gram of Blarcamesine, and optionally about 10 ml per gram of Blarcamesine. In any embodiment of this process, the molar ratio of maleic acid to Blarcamesine may be: about 1 to about 1.5 molar equivalents, about 1 to about 1.3 molar equivalents, about 1.1 to about 1.2 molar equivalents, or about 1.1 molar equivalents. Preferably, Blarcamesine free base is added to a solution of maleic acid in isopropanol or ethanol. In any embodiment, the resulting mixture formed by combining Blarcamesine with the solution of maleic acid may be a solution or a slurry. Preferably, the mixture in isopropanol may be a solution or slurry, and more preferably a slurry. Preferably the mixture in ethanol is a solution.

In any embodiment of this process, after the combining, the mixture may be stirred at a temperature of: about 2° C. to about 15° C., about 3° C. to about 10° C., about 3 to about 6° C., or about 4° C. The stirring may be carried out for a period of about: 30 minutes to about 4 hours, about 45 minutes to about 3 hours, or about 1 hour to about 2.5 hours, or about 2 hours.

In any embodiment of this process step (ii) is carried out, preferably by stirring at a temperature of: about 18 to about 40° C., about 20 to about 35° C., about 20 to about 30° C., about 22 to about 25° C. or at room temperature. The stirring may be carried out for any suitable time, preferably for about 4 to about 48 hours, about 8 to about 24 hours, about 15 to about 20 hours, or about 18 hours.

In any embodiment of this process, step (ii) is carried out, preferably by stirring at a temperature of: about 18 to about 40° C., about 20 to about 35° C., about 20 to about 30° C., about 22 to about 25° C. or at room temperature. The stirring may be carried out for any suitable time, preferably for about 4 to about 48 hours, about 8 to about 24 hours, about 15 to about 20 hours, or about 18 hours.

In any embodiment of this process, step (c) may comprise isolating crystalline form S5 from the mixture. The isolation can be carried out by any suitable method, for example by filtration, centrifuge, or decantation. Preferably the isolation is carried out by centrifuge. The crystals of form S5 of Blarcamesine Hydrogen Maleate may be washed with the reaction solvent, and optionally dried. The drying may be conducted in a vacuum oven at a temperature of about 18° C. to about 40° C., about 20° C. to about 30° C., or about 25° C. The drying may be carried out over a period of about 4 to about 48 hours, about 8 to about 24 hours, about 15 to about 20 hours, or about 18 hours.

The present disclosure includes a crystalline polymorph of Blarcamesine Hydrogen Maleate designated form S6. The crystalline Form S6 of Blarcamesine Hydrogen Maleate may be characterized by data selected from one or more of the following: an X-ray powder diffraction pattern substantially as depicted in FIG. 23; an X-ray powder diffraction pattern having peaks at 5.0, 10.1, 11.3, 15.3 and 25.4 degrees 2-theta±0.2 degrees 2-theta; a solid state $^{13}$C NMR spectrum with characteristic peaks at 173.9, 171.2, 145.8, 137.7 and 58.9 ppm±0.2 ppm; a solid state $^{13}$C NMR spectrum having the following chemical shift absolute differences from reference peak at 48.6 ppm±1 ppm: 125.3, 122.6, 97.3, 89.1 and 10.33 ppm±0.1 ppm; a solid state $^{13}$C NMR spectrum substantially as depicted in FIGS. 25, 26 and 27; and combinations of these data.

Crystalline Form S6 of Blarcamesine hydrogen Maleate may be further characterized by an X-ray powder diffraction pattern having peaks at 5.0, 10.1, 11.3, 15.3 and 25.4 degrees 2-theta±0.2 degrees 2-theta, and also having any one, two, three, four or five additional peaks selected from 12.9, 14.8, 16.8, 19.0 and 23.6 degrees 2-theta±0.2 degrees 2-theta.

Crystalline Form S6 of Blarcamesine Hydrogen Maleate may be alternatively characterized by X-ray powder diffraction pattern having peaks at 5.0, 10.1, 11.3, 12.9, 14.8, 15.3, 16.8, 19.0, 23.6 and 25.4 degrees 2-theta±0.2 degrees 2-theta or by an X-ray powder diffraction pattern having peaks at 5.0, 10.1, 11.3, 12.9, 14.8, 15.3, 16.8, 19.0, 20.3, 21.2, 21.9, 23.6, 24.7 and 25.4 degrees 2-theta±0.2 degrees 2-theta.

The above crystalline S6 of Blarcamesine Hydrogen Maleate may be an anhydrous form, as can be determined by TGA. In certain embodiments, the present disclosure comprises crystalline S6 of Blarcamesine Hydrogen Maleate having up to 0.5% w/w residual solvent content.

In one embodiment of the present disclosure, crystalline Form S6 of Blarcamesine Hydrogen Maleate is isolated.

Crystalline Form S6 of Blarcamesine Hydrogen Maleate may be characterized by each of the above characteristics alone/or by all possible combinations, e.g., an XRPD pattern having peaks at 5.0, 10.1, 11.3, 15.3 and 25.4 degrees 2-theta±0.2 degrees 2-theta; an XRPD pattern as depicted in FIG. 23, by the above described 13C NMR data; and combinations thereof.

Crystalline form S6 of Blarcamesine Hydrogen Maleate may be prepared by crystallisation from a mixture of Blarcamesine Hydrogen Maleate and a solvent comprising tetrahydrofuran. In any embodiment, the mixture is prepared by a process comprising:
  (a) providing a mixture of Blarcamesine Hydrogen Maleate in a solvent comprising tetrahydrofuran;
  (b) optionally stirring the mixture; and
  (c) optionally isolating crystalline form S6 of Blarcamesine Hydrogen Maleate from the mixture.

In any of the embodiments of this process, the mixture in step (a) may be prepared by:
  (i) Combining Blarcamesine free base and maleic acid in a solvent comprising tetrahydrofuran; and
  (ii) Optionally stirring the mixture.

Step (i) may be carried out by combining maleic acid with a solution of Blarcamesine in the solvent, by combining a solution of maleic acid in the solvent with a solution of Blarcamesine in the solvent, or by combining Blarcamesine with a solution of maleic acid in the solvent. Preferably step (i) is carried out by combining Blarcamesine with a solution of maleic acid in the solvent. More preferably, Blarcamesine is added to a solution of maleic acid in the solvent. In step (i), the solvent may be present in an amount of: about 5 to about 20 ml per gram of Blarcamesine, about 6 to about 15 ml per gram of Blarcamesine, or about 8 to about 12 ml per gram of Blarcamesine, or about 9 to about 11 ml per gram of Blarcamesine, and optionally about 10 ml per gram of Blarcamesine. In any embodiment of this process, the molar ratio of maleic acid to Blarcamesine may be: about 1 to about 1.5 molar equivalents, about 1 to about 1.3 molar equivalents, about 1.1 to about 1.2 molar equivalents, or about 1.1 molar equivalents. Preferably, Blarcamesine free base is added to a solution of maleic acid in tetrahydrofuran.

In any embodiment of this process, after the combining, the mixture may be stirred at a temperature of: about 2° C. to about 15° C., about 3° C. to about 10° C., about 3 to about 6° C., or about 4° C. The stirring may be carried out for a period of about: 30 minutes to about 4 hours, about 45 minutes to about 3 hours, or about 1 hour to about 2.5 hours, or about 2 hours.

In any embodiment of this process step (ii) is carried out, preferably by stirring at a temperature of: about 18 to about 40° C., about 20 to about 35° C., about 20 to about 30° C., about 22 to about 25° C. or at room temperature. The stirring may be carried out for any suitable time, preferably for about 4 to about 48 hours, about 8 to about 24 hours, about 15 to about 20 hours, or about 18 hours.

In any embodiment of this process, step (c) may comprise isolating crystalline form S6 from the mixture. The isolation can be carried out by any suitable method, for example by filtration, centrifuge, or decantation. Preferably the isolation is carried out by centrifuge. The crystals of form S6 of Blarcamesine Hydrogen Maleate may be washed with the reaction solvent, and optionally dried. The drying may be conducted in a vacuum oven at a temperature of about 18° C. to about 40° C., about 20° C. to about 30° C., or about 25° C. The drying may be carried out over a period of about 4 to about 48 hours, about 8 to about 24 hours, about 15 to about 20 hours, or about 18 hours.

The present disclosure includes a crystalline polymorph of Blarcamesine Camphorsulfonate designated form S7. The crystalline Form S7 of Blarcamesine Camphorsulfonate may be characterized by data selected from one or more of the following: an X-ray powder diffraction pattern substantially as depicted in FIG. 28; an X-ray powder diffraction pattern having peaks at 6.7, 12.8, 14.3, 18.7 and 19.5 degrees 2-theta±0.2 degrees 2-theta; and combinations of these data.

Crystalline Form S7 of Blarcamesine Camphorsulfonate may be further characterized by an X-ray powder diffraction pattern having peaks at 6.7, 12.8, 14.3, 18.7 and 19.5 degrees 2-theta±0.2 degrees 2-theta, and also having any one, two, three, four or five additional peaks selected from 13.3, 15.5, 16.6, 17.2 and 21.8 degrees 2-theta±0.2 degrees 2-theta.

In one embodiment of the present disclosure, crystalline Form S7 of Blarcamesine Camphorsulfonate is isolated.

Crystalline Form S7 of Blarcamesine Camphorsulfonate may be characterized by each of the above characteristics alone/or by all possible combinations, e.g., an XRPD pattern having peaks at 6.7, 12.8, 14.3, 18.7 and 19.5 degrees 2-theta±0.2 degrees 2-theta; an XRPD pattern as depicted in FIG. 28, and combinations thereof.

The above crystalline polymorphs of salts of Blarcamesine can be used to prepare other crystalline polymorphs of Blarcamesine, Blarcamesine salts, and/or their solid state forms.

The present disclosure encompasses a process for preparing other solid state forms of Blarcamesine, Blarcamesine salts, and solid state forms thereof. The process comprises preparing any one of the solid state forms of Blarcamesine salts of the present disclosure by the processes of the present disclosure, and converting it to said other form of Blarcamesine or Blarcamesine salt. The conversion can be done, for example, by a process comprising basifying any one of the above described forms of Blarcamesine salts and reacting the obtained Blarcamesine base with an appropriate acid, to obtain the corresponding salt. Alternatively, the conversion can be done by salt switching, i.e., reacting any one of the forms of the Blarcamesine salt of the present disclosure with an acid having a pKa which is lower than that of the acid of the original salt.

The present disclosure further relates to a process for preparation of form B3 of Blarcamesine HCl. In one embodiment the disclosure relates to a process for preparation of form B3 of Blarcamesine HCl from a solvent system comprising amyl alcohol and water.

In another embodiment the disclosure relates to a process for preparation of form B3 of Blarcamesine HCl comprising slurrying of form I of Blarcamesine HCl in a mixture of amyl alcohol and water.

In embodiments the disclosure relates to a process for preparation of form B3 of Blarcamesine HCl comprising: (a) adding form I of Blarcamesine HCl to amyl alcohol and stirring to obtain a slurry (b) adding water while stirring (c) optionally stirring (d) optionally filtering and optionally drying.

The present disclosure also provides uses of the said solid state forms of any one of HCl, HBr, Tosylate, Maleate, Camphorsulfonate and Besylate salts of Blarcamesine in the preparation of other solid state forms of Blarcamesine or it's salts and solid state forms thereof, particularly Blarcamesine HCl and solid state forms thereof.

The present disclosure provides crystalline polymorphs of any one of HCl, HBr, Tosylate, Maleate, Camphorsulfonate and Besylate salts of Blarcamesine for use in medicine, preferably for the treatment of Neurodegenerative and Neurodevelopmental Diseases such as Alzheimer's disease, Parkinson's disease dementia and/or Rett syndrome.

The present disclosure also encompasses the use of crystalline polymorphs of any one of HCl, HBr, Tosylate, Maleate, Camphorsulfonate and Besylate salts of Blarcamesine of the present disclosure for the preparation of pharmaceutical compositions and/or formulations.

In another aspect, the present disclosure provides pharmaceutical compositions comprising crystalline polymorphs of any one of HCl, HBr, Tosylate, Maleate, Camphorsulfonate and Besylate salts of Blarcamesine according to the present disclosure.

The present disclosure comprises processes for preparing the above mentioned pharmaceutical compositions. The processes comprise combining any one or a combination of the crystalline polymorphs of any one of HCl, HBr, Tosylate, Maleate, Camphorsulfonate and Besylate salts of Blarcamesine with at least one pharmaceutically acceptable excipient.

The crystalline polymorph of any one of HCl, HBr, Tosylate, Maleate, Camphorsulfonate and Besylate salts of Blarcamesine as defined herein and the pharmaceutical compositions or formulations of the any one of the crystalline polymorphs of any one of HCl, HBr, Tosylate, Maleate, Camphorsulfonate and Besylate salts of Blarcamesine may be used as medicaments, particularly for the treatment of Neurodegenerative and Neurodevelopmental Diseases such as Alzheimer's disease, Parkinson's disease dementia and/or Rett syndrome.

The present disclosure also provides methods of treating Neurodegenerative and Neurodevelopmental Diseases such as Alzheimer's disease, Parkinson's disease dementia and/or Rett syndrome, comprising administering a therapeutically effective amount of any one or a combination of any one of the crystalline polymorphs of any one of HCl, HBr, Tosylate, Maleate, Camphorsulfonate and Besylate salts of Blarcamesine of the present disclosure, or at least one of the above pharmaceutical compositions or formulations, to a subject suffering from a Neurodegenerative and Neurodevelopmental Diseases such as Alzheimer's disease, Parkinson's disease dementia and/or Rett syndrome, or otherwise in need of the treatment.

The present disclosure also provides the uses of any one of the crystalline polymorphs of any one of HCl, HBr, Tosylate, Maleate, Camphorsulfonate and Besylate salts of Blarcamesine of the present disclosure, or at least one of the above pharmaceutical compositions or formulations, for the manufacture of medicaments for treating e.g.: Neurodegenerative and Neurodevelopmental Diseases such as Alzheimer's disease, Parkinson's disease dementia and/or Rett syndrome.

Pharmaceutical formulations of the present invention contain any one or a combination of the solid state forms of any one of the Blarcamesine salts of the present disclosure. In addition to the active ingredient, the pharmaceutical formulations of the present invention can contain one or more excipients. Excipients are added to the formulation for a variety of purposes.

Diluents increase the bulk of a solid pharmaceutical composition, and can make a pharmaceutical dosage form containing the composition easier for the patient and caregiver to handle. Diluents for solid compositions include, for example, microcrystalline cellulose (e.g. Avicel®), microfine cellulose, lactose, starch, pregelatinized starch, calcium carbonate, calcium sulfate, sugar, dextrates, dextrin, dextrose, dibasic calcium phosphate dihydrate, tribasic calcium phosphate, kaolin, magnesium carbonate, magnesium oxide, maltodextrin, mannitol, polymethacrylates (e.g. Eudragit®), potassium chloride, powdered cellulose, sodium chloride, sorbitol, and talc.

Solid pharmaceutical compositions that are compacted into a dosage form, such as a tablet, can include excipients whose functions include helping to bind the active ingredient and other excipients together after compression. Binders for solid pharmaceutical compositions include acacia, alginic acid, carbomer (e.g. carbopol), carboxymethylcellulose sodium, dextrin, ethyl cellulose, gelatin, guar gum, hydrogenated vegetable oil, hydroxyethyl cellulose, hydroxypropyl cellulose (e.g. Klucel®), hydroxypropyl methyl cellulose (e.g. Methocel®), liquid glucose, magnesium aluminum silicate, maltodextrin, methylcellulose, polymethacrylates, povidone (e.g. Kollidon®, Plasdone®), pregelatinized starch, sodium alginate, and starch.

The dissolution rate of a compacted solid pharmaceutical composition in the patient's stomach can be increased by the addition of a disintegrant to the composition. Disintegrants include alginic acid, carboxymethylcellulose calcium, carboxymethylcellulose sodium (e.g. Ac-Di-Sol®, Primellose®), colloidal silicon dioxide, croscarmellose sodium, crospovidone (e.g. Kollidon®, Polyplasdone®), guar gum, magnesium aluminum silicate, methyl cellulose, microcrystalline cellulose, polacrilin potassium, powdered cellulose, pregelatinized starch, sodium alginate, sodium starch glycolate (e.g. Explotab®), and starch.

Glidants can be added to improve the flowability of a non-compacted solid composition and to improve the accuracy of dosing. Excipients that can function as glidants include colloidal silicon dioxide, magnesium trisilicate, powdered cellulose, starch, talc, and tribasic calcium phosphate.

When a dosage form such as a tablet is made by the compaction of a powdered composition, the composition is subjected to pressure from a punch and dye. Some excipients and active ingredients have a tendency to adhere to the surfaces of the punch and dye, which can cause the product to have pitting and other surface irregularities. A lubricant can be added to the composition to reduce adhesion and ease the release of the product from the dye. Lubricants include magnesium stearate, calcium stearate, glyceryl monostearate, glyceryl palmitostearate, hydrogenated castor oil, hydrogenated vegetable oil, mineral oil, polyethylene glycol, sodium benzoate, sodium lauryl sulfate, sodium stearyl fumarate, stearic acid, talc, and zinc stearate.

Flavoring agents and flavor enhancers make the dosage form more palatable to the patient. Common flavoring agents and flavor enhancers for pharmaceutical products that can be included in the composition of the present invention include maltol, vanillin, ethyl vanillin, menthol, citric acid, fumaric acid, ethyl maltol, and tartaric acid.

Solid and liquid compositions can also be dyed using any pharmaceutically acceptable colorant to improve their appearance and/or facilitate patient identification of the product and unit dosage level.

In liquid pharmaceutical compositions of the present disclosure, any one of the Blarcamesine salts of the present disclosure and any other solid excipients are dissolved or suspended in a liquid carrier such as water, vegetable oil, alcohol, polyethylene glycol, propylene glycol, or glycerin.

Liquid pharmaceutical compositions can contain emulsifying agents to disperse uniformly throughout the composition an active ingredient or other excipient that is not soluble in the liquid carrier. Emulsifying agents that can be useful in liquid compositions of the present invention include, for example, gelatin, egg yolk, casein, cholesterol, acacia, tragacanth, chondrus, pectin, methyl cellulose, carbomer, cetostearyl alcohol, and cetyl alcohol.

Liquid pharmaceutical compositions of the present invention can also contain a viscosity enhancing agent to improve the mouth-feel of the product and/or coat the lining of the gastrointestinal tract. Such agents include acacia, alginic acid bentonite, carbomer, carboxymethylcellulose calcium or sodium, cetostearyl alcohol, methyl cellulose, ethylcellulose, gelatin guar gum, hydroxyethyl cellulose, hydroxypropyl cellulose, hydroxypropyl methyl cellulose, maltodextrin, polyvinyl alcohol, povidone, propylene carbonate, propylene glycol alginate, sodium alginate, sodium starch glycolate, starch tragacanth, and xanthan gum.

Sweetening agents such as sorbitol, saccharin, sodium saccharin, sucrose, aspartame, fructose, mannitol, and invert sugar can be added to improve the taste.

Preservatives and chelating agents such as alcohol, sodium benzoate, butylated hydroxyl toluene, butylated hydroxyanisole, and ethylenediamine tetraacetic acid can be added at levels safe for ingestion to improve storage stability.

According to the present invention, a liquid composition can also contain a buffer such as gluconic acid, lactic acid, citric acid, or acetic acid, sodium gluconate, sodium lactate, sodium citrate, or sodium acetate. Selection of excipients and the amounts used can be readily determined by the formulation scientist based upon experience and consideration of standard procedures and reference works in the field.

The solid compositions of the present invention include powders, granulates, aggregates, and compacted compositions. The dosages include dosages suitable for oral, buccal, rectal, parenteral (including subcutaneous, intramuscular, and intravenous), inhalant, and ophthalmic administration. Although the most suitable administration in any given case will depend on the nature and severity of the condition being treated, the most preferred route of the present invention is oral. The dosages can be conveniently presented in unit dosage form and prepared by any of the methods well-known in the pharmaceutical arts.

Dosage forms include solid dosage forms like tablets, powders, capsules, suppositories, sachets, troches, and lozenges, as well as liquid syrups, suspensions, and elixirs.

The dosage form of the present invention can be a capsule containing the composition, preferably a powdered or granulated solid composition of the invention, within either a hard or soft shell. The shell can be made from gelatin and optionally contain a plasticizer such as glycerin and sorbitol, and an opacifying agent or colorant.

The active ingredient and excipients can be formulated into compositions and dosage forms according to methods known in the art.

A composition for tableting or capsule filling can be prepared by wet granulation. In wet granulation, some or all of the active ingredients and excipients in powder form are blended and then further mixed in the presence of a liquid, typically water, that causes the powders to clump into granules. The granulate is screened and/or milled, dried, and then screened and/or milled to the desired particle size. The granulate can then be tableted, or other excipients can be added prior to tableting, such as a glidant and/or a lubricant.

A tableting composition can be prepared conventionally by dry blending. For example, the blended composition of the actives and excipients can be compacted into a slug or a sheet and then comminuted into compacted granules. The compacted granules can subsequently be compressed into a tablet.

As an alternative to dry granulation, a blended composition can be compressed directly into a compacted dosage form using direct compression techniques. Direct compression produces a more uniform tablet without granules. Excipients that are particularly well suited for direct compression tableting include microcrystalline cellulose, spray dried lactose, dicalcium phosphate dihydrate, and colloidal silica. The proper use of these and other excipients in direct compression tableting is known to those in the art with experience and skill in particular formulation challenges of direct compression tableting.

A capsule filling of the present invention can comprise any of the aforementioned blends and granulates that were described with reference to tableting, but they are not subjected to a final tableting step.

A pharmaceutical formulation of any one of the solid state forms of the Blarcamesine salts of the present disclosure can be administered. Any one of the solid state forms of the Blarcamesine salts of the present disclosure is preferably formulated for administration to a mammal, preferably a human, by injection. Any one of the solid state forms of the Blarcamesine salts of the present disclosure salt can be formulated, for example, as a viscous liquid solution or suspension, preferably a clear solution, for injection. The formulation can contain one or more solvents. A suitable solvent can be selected by considering the solvent's physical and chemical stability at various pH levels, viscosity (which would allow for syringeability), fluidity, boiling point, miscibility, and purity. Suitable solvents include alcohol USP, benzyl alcohol NF, benzyl benzoate USP, and Castor oil USP. Additional substances can be added to the formulation such as buffers, solubilizers, and antioxidants, among others. Ansel et al., Pharmaceutical Dosage Forms and Drug Delivery Systems, 7th ed.

The crystalline polymorphs of any one of the Blarcamesine salts of the present disclosure and the pharmaceutical compositions and/or formulations of any one of the Blarcamesine salts of the present disclosure can be used as medicaments, particularly in the treatment of Neurodegenerative and Neurodevelopmental Diseases such as Alzheimer's disease, Parkinson's disease dementia and/or Rett syndrome.

The present disclosure also provides methods of treating Neurodegenerative and Neurodevelopmental Diseases such as Alzheimer's disease, Parkinson's disease dementia and/or Rett syndrome by administering a therapeutically effective amount of any one or a combination of the crystalline polymorphs of any one of the Blarcamesine salts of the present disclosure, or at least one of the above pharmaceutical compositions and/or formulations, to a subject in need of the treatment.

Having thus described the disclosure with reference to particular preferred embodiments and illustrative examples, those in the art can appreciate modifications to the disclosure as described and illustrated that do not depart from the spirit and scope of the disclosure as disclosed in the specification. The Examples are set forth to aid in understanding the disclosure but are not intended to, and should not be construed to limit its scope in any way.

Powder X-Ray Diffraction ("XRPD") Method

XRPD analysis was performed on ARL (SCINTAG) powder X-Ray diffractometer model X'TRA equipped with a solid state detector. Copper radiation of 1.5418 Å was used. Scanning parameters: range: 2-40 degrees two-theta; scan mode: continuous scan; step size: 0.05°, and a rate of 3 deg/min.

TGA Analysis Method

Thermogravimetric analysis was carried out on Mettler Toledo TGA/DSC with the following:

Scanning Parameters:
  Heating between 25-250° C.
  Heating rate: 10° C./min.
  Purging with 40 ml/min N2 flow.
  Sample weight: 7-15 mg.
  Crucible: 150 μL alumina Crucible with standard aluminum lid.

FTIR-Thermo Scientific, Nicolet iS5, iD7 ATR or Equivalent

Measuring Parameters:
  Renge: 4000-400 $cm^{-1}$
  No. of scans: 16
  Resolution: 4 $cm^{-1}$ $^{13}C$ NMR Method Solid-state 13C NMR spectra were recorded with variable amplitude cross polarization, magic angle spinning and high power proton decoupling using a BRUKER Avance II+ spectrometer operating at 125 MHz and controlled temperature at 0° C. A probe using 4 mm o.d. zirconia rotors was employed. The operation conditions were: contact time: 2 ms; recycle delay: 9 s; 400 scans and spin rate of 13 kHz. Chemical shifts were referenced via a replacement sample of adamantane (methylene carbon chemical shift assigned as 40.48 ppm relative to the signal of tetramethylsilane).

SEM Method

SEM micrographs were taken on Phenom Pro, scanning microscope at 10 kV, low current. Samples were sputtered with gold by Denton Desk V sputter coater

EXAMPLES

Blarcamesine HCl salt form I may be prepared according to example 1 of International Publication No. WO 2019/200345.

Blarcamesine free base may be prepared according to Example 9 of WO2019200345 or according to the following procedure:

Methanol (3 ml, 100V) was added to Blarcamesine base (30 mg, 0.09 mmol) and stirred at room temperature to give a clear solution. The clear solution was mechanically filtered and was left for 2 days for slow evaporation.

Example 1: Preparation of Form a of Blarcamesine HBr

Procedure A

Ethyl acetate (10 ml, 10V) was added to Blarcamesine free base (1 grams, 3.55 mmol) and was magnetically stirred at room temperature over a period of 15 minutes to obtain complete dissolution. The magnetically stirred clear solution was cooled to 4° C. and then 0.718 ml of an aqueous solution of HBr (48% w/w) was dropwise added to give a solid precipitate. Next, the obtained slurry was magnetically stirred at 4° C. during 18 hours. After that, the obtained solid was filtered by vacuum, then washed with IPA (2V*2) and dried in vacuum oven at 45° C. during 18 hours. The obtained solid was analyzed by XRPD and the XRPD pattern is presented in FIG. 1.

Procedure B

Isopropyl alcohol (5 ml, 10V) was added to Blarcamesine free base (0.5 grams, 1.77 mmol) and was magnetically stirred at room temperature to obtain a slurry. The magnetically stirred slurry was cooled to 4° C. and then 0.36 ml of an aqueous solution of HBr (48% w/w) was dropwise added to give a slurry. Next, the obtained slurry was magnetically stirred at 4° C. during 18 hours. After that, the obtained solid was filtered by vacuum dried in vacuum oven at 45° C. during 18 hours. The obtained solid was characterized by X-ray powder diffraction and identified as form A of Blarcamesine HBr.

Example 2: Preparation of Form B of Blarcamesine HBr

Procedure A

Methanol (0.24 ml, 8V) was added to Blarcamesine HBr salt crystal form A (30 mg, 0.08 mmol) to obtain a slurry. The slurry was magnetically stirred at room temperature over a period of 15 minutes to obtain complete dissolution followed by mechanical filtration using a filter disk. Then, the solution was exposed to air at room temperature for slow solvent evaporation over 72 hours to give precipitation. The obtained solid was analyzed by X-ray powder diffraction and the XRPD pattern is presented in FIG. 7.

Procedure B

Water (1.2 ml, 40V) was added to Blarcamesine HBr salt crystal form A (30 mg, 0.08 mmol) to obtain a slurry. The slurry was magnetically stirred at room temperature over a period of 15 minutes to obtain complete dissolution followed by mechanical filtration using filter disk. Then, the solution was exposed to air at room temperature for slow solvent evaporation over 12 days to give precipitation. The obtained solid was characterized by X-ray powder diffraction and identified as form B of Blarcamesine HBr.

Procedure C

Methanol (5 ml, 10V) was added to Blarcamesine free base (0.5 grams, 1.77 mmol) and was magnetically stirred at room temperature o obtain slurry. The magnetically stirred slurry was cooled to 4° C. and then 0.36 ml of an aqueous solution of HBr (48% w/w) was dropwise added to give a slurry. Next, the obtained slurry was magnetically stirred at 4° C. during 18 hours. After that, the obtained solid was filtered by vacuum. The solid was characterized by X-ray powder diffraction and identified as form B of Blarcamesine HBr.

The solid was further dried in vacuum oven at 45° C. during 18 hours. The dried solid was characterized by X-ray powder diffraction and identified as form B of Blarcamesine HBr.

Procedure D

Water (15 ml, 30V) was added to Blarcamesine free base (0.5 grams, 1.77 mmol) and was magnetically stirred at room temperature to obtain slurry. To the magnetically stirred slurry, 0.36 ml of an aqueous solution of HBr (48% w/w) was dropwise added to give a cloudy solution. Next, after stirring for 15 minutes the massive precipitation occurs. Next, the obtained slurry was magnetically stirred at room temperature during 18 hours and then was filtered by vacuum and washed with water (0.5 ml*2). The solid was dried in vacuum oven at 45° C. during 72 hours. The solid was characterized by X-ray powder diffraction and identified as form B of Blarcamesine HBr.

Example 3: Preparation of Form S1 of Blarcamesine Besylate

Tetrahydrofuran (THF) (1.0 ml, 10 V) was added to benzene sulfonic acid (62 mg, 0.39 mmol, 1.1 eq.) and stirred at room temperature to obtain complete dissolution. Blarcamesine free base (100 mg, 0.36 mmol, 1.0 eq.) was added to the obtained clear solution and was magnetically stirred at room temperature over a period of 5 minutes to obtain complete dissolution. Next, the obtained solution was magnetically stirred at 4° C. during 2 hours to give a solid precipitation. The obtained slurry was magnetically stirred at room temperature during 18 hours. The obtained solid was filtered by centrifuge, washed by THF (1V) and dried in vacuum oven at 25° C. during 3 days. Next, the solid was heated at rate of 10° C./min until 120° C. under nitrogen atmosphere (about 50 ml/min N2 flow) in TGA instrument. The obtained solid was analyzed by XRPD and the XRPD pattern is presented in FIG. 14.

Example 4: Preparation of Form S2 of Blarcamesine Besylate

Ethanol (0.5 ml, 5V) was added to benzene sulfonic acid (62 mg, 0.39 mmol, 1.1 eq.) and stirred at room temperature to obtain complete dissolution. Next, Blarcamecine free base (100 mg, 0.36 mmol, 1.0 eq.) was added to the obtained clear solution at room temperature to give slurry. The obtained slurry was magnetically stirred at room temperature during 18 hours. The obtained solid was filtered by centrifuge, washed by EtOH (1V) and dried in vacuum oven at 25° C. during 18 hours. The obtained solid was analyzed by XRD and the XRPD is presented in FIG. 15.

Example 5: Preparation of Form S3 of Blarcamesine Tosylate

Ethanol (0.5 ml, 5 V) was added to Blarcamesine free base (100 mg, 0.36 mmol) to obtain slurry. The slurry was magnetically stirred and heated to 60° C. over a period of 15 minutes to obtain complete dissolution. The obtained solution was added to the previously prepared toluene sulfonic acid monohydrate ethanol solution (74 mg, 0.39 mmol, 1.1 eq. toluene sulfonic acid monohydrate dissolved in 0.5 ml EtOH) and heated to 60° C. The solution was magnetically stirred at 60° C. for 1 hour and then cooled to room temperature. The solution was stirred at room temperature for additional 18 hours. Next, hexane as anti-solvent (3 ml) was added drop-wise to the stirred clear solution at room temperature to give precipitation. Then, the obtained slurry was stirred at room temperature during 8 hours. After that, the obtained solid was filtered by centrifuge, then washed with EtOH (1V) and dried in vacuum oven at 25° C. during 2 hours. The obtained solid was analyzed by X-ray powder diffraction and the XRPD pattern is presented in FIG. 16.

Example 6: Preparation of Form S4 of Blarcamesine Tosylate

Ethanol (0.5 ml, 5V) was added to toluene sulfonic acid monohydrate (74 mg, 0.39 mmol, 1.1 eq.) and stirred at room temperature to obtain complete dissolution. Blarcamesine free base (100 mg, 0.36 mmol, 1.0 eq.) was added to the obtained clear solution and was magnetically stirred at room temperature over a period of 5 minutes to obtain complete dissolution. Next, the obtained clear solution was magnetically stirred at 4° C. during 18 hours for precipitation. After that, the obtained solid was filtered by centrifuge, then washed with EtOH (1V) and dried in vacuum oven at 25° C. during 18 hours. The obtained solid was analyzed by X-ray powder diffraction and the XRPD pattern is presented in FIG. 17.

Example 7: Preparation of Form S5 of Blarcamesine Hydrogen Maleate

Procedure A

Isopropanol (IPA, 1 ml, 10V) was added to maleic acid (45.38 mg, 0.39 mmol, 1.1 eq.) and stirred at room temperature to obtain complete dissolution. Blarcamesine free base (100 mg, 0.36 mmol, 1.0 eq.) was added to the obtained clear solution and was magnetically stirred at room temperature over a period of 5 minutes to obtain complete dissolution. Next, the obtained clear solution was magnetically stirred at 4° C. during 2 hours for precipitation. Then, the obtained slurry was stirred at room temperature during 18 hours. The obtained solid was filtered by centrifuge, then washed with IPA (1V) and dried in vacuum oven at 25° C. during 18 hours. The obtained solid was analyzed by X-ray powder diffraction and the XRPD pattern is presented in FIG. 18.

Procedure B

Isopropanol (IPA, 1 ml, 10V) was added to maleic acid (45.38 mg, 0.39 mmol, 1.1 eq.) and stirred at room temperature to obtain complete dissolution. Blarcamesine free base (100 mg, 0.36 mmol, 1.0 eq.) was added to the obtained clear solution to give a mixture. The mixture was magnetically stirred at room temperature during 18 hours. Then, the obtained solid was separated by centrifuge, then washed with IPA (1V) and dried in vacuum oven at 25° C. during 18 hours The obtained solid was analyzed by X-ray powder diffraction and identified as form S5 of Blarcamesine Hydrogen Maleate.

Procedure C

Ethanol (1 ml, 10V) was added to maleic acid (45.38 mg, 0.39 mmol, 1.1 eq.) and stirred at room temperature to obtain complete dissolution. Blarcamesine free base (100 mg, 0.36 mmol, 1.0 eq.) was added to the obtained clear solution to give a mixture. The mixture was magnetically stirred at room temperature during 18 hours. Then, the obtained solid was separated by centrifuge, then washed with ethanol (1V) and dried in vacuum oven at 25° C. during 18 hours The obtained solid was analyzed by X-ray powder diffraction and identified as form S5 of Blarcamesine Hydrogen Maleate.

Example 8: Preparation of Form S6 of Blarcamesine Hydrogen Maleate

Tetrahydrofuran (THF) (1 ml, 10V) was added to maleic acid (45.38 mg, 0.39 mmol, 1.1 eq.) and stirred at room temperature to obtain complete dissolution. Blarcamesine free base (100 mg, 0.36 mmol, 1.0 eq.) was added to the obtained clear solution and was magnetically stirred at room temperature over a period of 15 minutes to obtain complete dissolution. Next, the obtained clear solution was magnetically stirred at 4° C. during 2 hours for precipitation. Then, the obtained slurry was stirred at room temperature during 18 hours. The obtained solid was filtered by centrifuge, washed by THF (1V) and dried in vacuum oven at 25° C.

during 18 hours. The obtained solid was analyzed by X-ray powder diffraction and the XRPD pattern is presented in FIG. 23.

Example 9: Preparation of form S7 of Blarcamesine Camphorsulfonate

Tetrahydrofuran (THF) (0.5 ml, 5V) was added to 1 (s)-(+)-10-Camphor sulfonic acid (90.8 mg, 0.39 mmol, 1.1 eq.) and stirred at room temperature to obtain complete dissolution. Blarcamesine free base (100 mg, 0.36 mmol, 1.0 eq.) was added to the obtained clear solution and was magnetically stirred at room temperature over a period of 15 minutes to obtain complete dissolution. Next, the obtained clear solution was magnetically stirred at 4° C. during 2 hours. Then, methylcyclohexane as anti solvent (1.5 ml) was added drop-wise to the stirred clear solution at to give precipitation. The obtained slurry was magnetically stirred at 4° C. during 18 hours. After that, the obtained solid was separated by solvents decantation. Next, ethyl acetate (0.5 ml) was added to wet solid and was magnetically stirred at room temperature over a period of 1 hour to obtain complete dissolution. Then, methyl tert-butyl ether (1.5 ml) was added to obtained clear solution and cooled to at 4° C. The solution was magnetically stirred at 4° C. during 4 hours. After that, the solvents were slowly evaporated at room temperature during 3 days and the solid was obtained. The obtained solid was analyzed by XRPD and the XRPD pattern is presented in FIG. 28.

Example 10: Preparation of Crystalline Form B3 of Blarcamesine HCl

Blarcamesine HCl salt form I (1 gr, 3.1 mmol) was added to Amyl alcohol (14.5 ml, 14.5V) and was magnetically stirred at room temperature to obtain slurry. Then, water (0.5 ml, 0.5V) was added to the magnetically stirred slurry at room temperature. Next, the slurry was magnetically stirred at room temperature during 7 days. After that, the obtained solid was filtered by vacuum and dried in vacuum oven at 25° C. during 18 hours. The obtained solid was analyzed by X-ray powder diffraction and the XRPD pattern is presented in FIG. 13.

The invention claimed is:

1. A crystalline form of Blarcamesine HBr designated Form A, which is characterized by data selected from one or more of the following:
   (a) an XRPD pattern having peaks at 6.4, 13.9, 19.2, 20.3 and 21.5 degrees 2-theta±0.2 degrees 2-theta;
   (b) an XRPD pattern substantially as depicted in FIG. 1;
   (c) an XRPD pattern having peaks at 6.4, 13.9, 19.2, 20.3 and 21.5 degrees 2-theta #0.2 degrees 2-theta, and also having one, two, three, four or five additional peaks selected from 11.6, 13.1, 16.1, 22.3 or 23.2 degrees two theta±0.2 degrees two theta;
   (d) an X-ray powder diffraction pattern having peaks at 6.4, 11.6, 13.1, 13.9, 16.1, 19.2, 20.3, 21.5, 22.3 and 23.2 degrees 2-theta±0.2 degrees 2-theta;
   (e) an X-ray powder diffraction pattern having peaks at 6.4, 11.6, 12.6, 13.1, 13.9, 16.1, 19.2, 20.3, 21.5, 22.3, 23.2, 25.4, 26.0, 27.5 and 29.0 degrees 2-theta±0.2 degrees 2-theta;
   (f) a solid state 13C NMR spectrum with characteristic peaks at 143.7, 127.1, 59.0, 50.7 and 43.5 ppm±0.2 ppm;
   (g) a solid state 13C NMR spectrum having the following chemical shift absolute differences from reference peak at 146.7 ppm±1 ppm: 3.0, 19.6, 87.7, 96.0 and 103.2 ppm±0.1 ppm;
   (h) a solid state 13C NMR spectrum substantially as depicted in FIG. 3, 4 or 5; and
   (i) combinations of these data.

2. The crystalline form according to claim 1, designated Form A, wherein the crystalline form is an anhydrous form.

3. The crystalline form according to claim 1, designated Form A, which contains no more than about 20% of any other crystalline forms of Blarcamesine HBr.

4. The crystalline form according to claim 1, designated Form A, which contains no more than about 20% of amorphous Blarcamesine HBr.

5. A crystalline form of Blarcamesine HBr designated Form B, which is characterized by data selected from one or more of the following:
   (a) an XRPD pattern having peaks at 7.9, 10.2, 11.9, 15.9 and 21.1 degrees 2-theta±0.2 degrees 2-theta;
   (b) an XRPD pattern substantially as depicted in FIG. 7;
   (c) an XRPD pattern having peaks at 7.9, 10.2, 11.9, 15.9 and 21.1 degrees 2-theta±0.2 degrees 2-theta, and also having one, two, three, four or five additional peaks selected from 13.1, 16.9, 17.9, 20.4 or 23.8 degrees two theta±0.2 degrees two theta;
   (d) an X-ray powder diffraction pattern having peaks at 7.9, 10.2, 11.9, 13.1, 15.9, 16.9, 17.9, 20.4, 21.1 and 23.8 degrees 2-theta±0.2 degrees 2-theta;
   (e) an X-ray powder diffraction pattern having peaks at 7.9, 10.2, 11.9, 13.1, 15.9, 16.4, 16.9, 17.9, 19.6, 20.0, 20.4, 21.1, 23.8, 24.3, 25.2, 25.5 and 26.3 degrees 2-theta±0.2 degrees 2-theta;
   (f) a solid state 13C NMR spectrum with characteristic peaks at 144.8, 134.8, 47.0, 46.5 and 42.7 ppm±0.2 ppm;
   (g) a solid state 13C NMR spectrum having the following chemical shift absolute differences from reference peak at 148.9 ppm #1 ppm: 4.1, 14.1, 101.9, 102.4 and 106.2 ppm±0.1 ppm;
   (h) a solid state 13C NMR spectrum substantially as depicted in FIG. 9, 10 or 11; and
   (i) combinations of these data.

6. The crystalline form according to claim 5, designated Form B, wherein the crystalline form is an anhydrous form.

7. The crystalline form according to claim 5, designated Form B, which contains no more than about 20% of any other crystalline forms of Blarcamesine HBr.

8. The crystalline form according to claim 5, designated Form B, which contains no more than about 20% of amorphous Blarcamesine HBr.

9. A pharmaceutical composition comprising the crystalline form according to claim 1 and at least one pharmaceutically acceptable excipient.

10. A process for preparing a pharmaceutical composition, comprising combining the crystalline form according to claim 1, with at least one pharmaceutically acceptable excipient.

11. A medicament comprising the crystalline form according to claim 1.

12. A method of treating Neurodegenerative and Neurodevelopmental Diseases wherein the diseases are selected from Alzheimer's disease, Parkinson's disease dementia and/or Rett syndrome, comprising administering a therapeutically effective amount of the crystalline form according to claim 1, to a subject in need of the treatment.

13. A process for preparing a Blarcamesine salt or a solid state form thereof, comprising preparing crystalline form of claim 1, and converting it to another solid state form of Blarcamesine or another salt or a solid state form thereof.

14. A pharmaceutical composition comprising the crystalline form according to claim 5 and at least one pharmaceutically acceptable excipient.

15. A process for preparing a pharmaceutical composition comprising combining the crystalline form according to claim 5, with at least one pharmaceutically acceptable excipient.

16. A medicament comprising the crystalline form according to claim 5.

17. A method of treating Neurodegenerative and Neurodevelopmental Diseases wherein the diseases are selected from Alzheimer's disease, Parkinson's disease, dementia and/or Rett syndrome, comprising administering a therapeutically effective amount of the crystalline form according to claim 5, to a subject in need of the treatment.

18. A process for preparing a Blarcamesine salt or a solid state form thereof, comprising preparing crystalline form of claim 5, and converting it to another solid state form of Blarcamesine or another salt or a solid state form thereof.

* * * * *